United States Patent
Zhang et al.

(10) Patent No.: US 10,979,863 B2
(45) Date of Patent: Apr. 13, 2021

(54) SYSTEMS AND METHODS FOR RECOMMENDING A DESTINATION

(71) Applicant: BEIJING DIDI INFINITY TECHNOLOGY AND DEVELOPMENT CO., LTD., Beijing (CN)

(72) Inventors: Lingyu Zhang, Beijing (CN); Chao Ye, Beijing (CN); Wenjie Li, Beijing (CN); Bin Huang, Beijing (CN); Xiangyi Zhong, Beijing (CN); Shaojun Mo, Beijing (CN); Yong Qiao, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/747,499

(22) Filed: Jan. 20, 2020

(65) Prior Publication Data

US 2020/0154245 A1     May 14, 2020

Related U.S. Application Data

(63) Continuation of application No. PCT/CN2018/096099, filed on Jul. 18, 2018.

(30) Foreign Application Priority Data

Jul. 20, 2017  (CN) .......................... 201710597615.0
Jul. 26, 2017  (CN) .......................... 201710620451.9

(51) Int. Cl.
*H04W 4/029* (2018.01)
*G06F 16/909* (2019.01)

(52) U.S. Cl.
CPC .......... *H04W 4/029* (2018.02); *G06F 16/909* (2019.01)

(58) Field of Classification Search
CPC ........................... H04W 4/029; G06F 16/909
(Continued)

(56) References Cited

U.S. PATENT DOCUMENTS 7,720,844 B2 *  5/2010  Chu .................. G06F 16/29
                                              707/724
8,559,979 B2 * 10/2013  Gonzales ........... G06Q 30/0281
                                              455/456.3

(Continued)

FOREIGN PATENT DOCUMENTS

CA      2602879 A1      3/2003
CN    103364002 A      10/2013
(Continued)

OTHER PUBLICATIONS

The Extended European Search Report in European Application No. 18835803.0 dated Jul. 10, 2020, 8 pages.
(Continued)

*Primary Examiner* — William Nealon
(74) *Attorney, Agent, or Firm* — Metis IP LLC

(57) ABSTRACT

The present disclosure relates to systems and methods for remotely operating an interface of a mobile device. The method may include receiving a request for an LBS sent from the mobile device through the information exchange port, and obtaining a current time point in response to the request for the LBS. The method may also include obtaining historical behavior information related to a user of the mobile device. The method may also include determining, based on the historical behavior information and the current time point, one or more recommended destinations for the user. The method may further include remotely controlling
(Continued)

the interface of the mobile device, through the information exchange port, to display the one or more recommended destinations.

20 Claims, 24 Drawing Sheets

(58) Field of Classification Search
USPC .................................................... 455/456.3
See application file for complete search history.

(56) References Cited

U.S. PATENT DOCUMENTS

| | | | |
|---|---|---|---|
| 2007/0073477 A1* | 3/2007 | Krumm | G01C 21/34 |
| | | | 701/423 |
| 2008/0153512 A1* | 6/2008 | Kale | H04W 4/029 |
| | | | 455/456.3 |
| 2008/0172362 A1* | 7/2008 | Shacham | G06F 16/338 |
| 2011/0093458 A1* | 4/2011 | Zheng | G06F 17/30589 |
| | | | 707/724 |
| 2011/0313647 A1 | 12/2011 | Koebler et al. | |
| 2013/0066548 A1* | 3/2013 | Gruen | G01C 21/3617 |
| | | | 701/410 |
| 2013/0345961 A1 | 12/2013 | Leader et al. | |
| 2014/0095063 A1 | 4/2014 | Saraswat | |
| 2014/0149213 A1 | 5/2014 | Fallatah | |
| 2015/0106230 A1 | 4/2015 | Lyman | |
| 2015/0278712 A1* | 10/2015 | Fujita | G06Q 10/06311 |
| | | | 705/5 |
| 2018/0017405 A1 | 1/2018 | Chen et al. | |
| 2018/0181910 A1 | 6/2018 | Zhang et al. | |

FOREIGN PATENT DOCUMENTS

| | | |
|---|---|---|
| CN | 104599217 A | 5/2015 |
| CN | 104833365 A | 8/2015 |
| CN | 105243441 A | 1/2016 |
| CN | 105277189 A | 1/2016 |
| CN | 106500709 A | 3/2017 |
| CN | 106919993 A | 7/2017 |
| CN | 106949901 A | 7/2017 |

OTHER PUBLICATIONS

International Search Report in PCT/CN2018/096099 dated Sep. 30, 2018, 4 pages.
Written Opinion in PCT/CN2018/096099 dated Sep. 20, 2018, 4 pages.
Song, Deyu et al., Principle of Programmable Controller and Design Technology of Application System, Metallurgical Industry Press, 255-256, 2014.

* cited by examiner

1500

```
┌─────────────────────────────────────────────────────────────┐
│ Obtaining historical service orders initiated by a user     │
│ corresponding to each of one or more time intervals based   │──1501
│ on historical behavior information related to the user      │
└─────────────────────────────────────────────────────────────┘
                              │
                              ▼
┌─────────────────────────────────────────────────────────────┐
│ Designating one or more destinations of one or more         │
│ historical service orders corresponding to a target time    │──1502
│ interval that includes a current time point as one or more  │
│ recommended destinations                                    │
└─────────────────────────────────────────────────────────────┘
                              │
                              ▼
┌─────────────────────────────────────────────────────────────┐
│ Determining one or more routes to reach the recommended     │
│ destination, and transmitting the one or more routes to the │──1503
│ user                                                        │
└─────────────────────────────────────────────────────────────┘
```

| Recommending one or more bus routes passing through one or more bus stations near to a user if historical behavior information related to the user does not include historical behavior information corresponding to a current time point | ⟋1601 |

| In response to a user selection of one of the bus routes, generating a relationship between a target time interval including the current time point, a current location of the user, and the selected bus route, and storing the relationship into a set of candidate public routes | ⟋1602 |

FIG. 16

SYSTEMS AND METHODS FOR RECOMMENDING A DESTINATION

CROSS-REFERENCE TO RELATED APPLICATIONS

This application is a continuation of International Application PCT/CN2018/096099, filed on Jul. 18, 2018, which claims priority to Chinese Patent Application No. 201710597615.0 filed on Jul. 20, 2017 and Chinese Patent Application No. 201710620451.9 filed on Jul. 26, 2017, the contents of which are incorporated herein by reference in their entirety.

TECHNICAL FIELD

The present disclosure generally relates to location-based service (LBS) platforms, and more specifically, relates to systems and methods for recommending a destination for users in LBS platforms.

BACKGROUND

With the development of Internet technology, LBSs play a more and more significant role in people's daily lives. For example, the location information of a mobile device has been widely used in the online taxi-hailing services, navigation services, or the like. When a user makes a request for an LBS via the mobile phone, he/she may need to manually input a location. For example, when a passenger hails a taxi, he/she needs to manually input a destination, which is time-consuming. Therefore, it is desirable to provide systems and methods for automatically recommending a destination in LBS platforms upon detecting the user's request for the service, thus improving the efficiency of location input or location search.

SUMMARY

In one aspect of the present disclosure, a system for remotely operating an interface of a mobile device is provided. The system may include an information exchange port in communication with a mobile device to remotely control an interface of the mobile device, at least one storage medium including a set of instructions, and at least one processor in communication with the at least one storage medium. When executing the set of instructions, the at least one processor may be configured to direct the system to receive a request for an LBS sent from the mobile device through the information exchange port, and obtain a current time point in response to the request for the LBS. The at least one processor may also be configured to direct the system to obtain historical behavior information related to a user of the mobile device. The at least one processor may also be configured to direct the system to determine, based on the historical behavior information and the current time point, one or more recommended destinations for the user. The at least one processor may also be configured to direct the system to remotely control the interface of the mobile device to display the one or more recommended destinations, through the information exchange port.

In some embodiments, the historical behavior information may include a plurality of historical destinations and one or more historical departure times corresponding to each of the plurality of historical destinations. For each of the plurality of historical destinations, the at least one processor may further be configured to direct the system to determine a probability that the user goes to the historical destination at the current time point based on the historical behavior information. The at least one processor may also be configured to direct the system to determine, among the plurality of historical destinations, the one or more recommended destinations based on the probabilities corresponding to the plurality of historical destinations.

In some embodiments, the at least one processor may further be configured to direct the system to obtain geographic information related to each of the plurality of historical destinations. The at least one processor may also be configured to direct the system to merge the plurality of historical destinations to generate one or more merged historical destinations based on the geographic information. For each of the merged historical destinations, the at least one processor may also be configured to direct the system to determine a probability that the user goes to the merged historical destination at the current time point based on the historical behavior information.

In some embodiments, the at least one processor may further be configured to direct the system to determine a first distance between the pair of historical destinations based on the corresponding geographic information. The at least one processor may also be configured to direct the system to determine whether the first distance is less than a first threshold distance. In response to a determination that the first distance is less than the first threshold distance, the at least one processor may also be configured to direct the system merge the pair of historical destinations into a merged historical destination.

In some embodiments, the at least one processor may further be configured to direct the system to determine an average departure time that the user went to the historical destination based on the one or more corresponding historical departure times. The at least one processor may also be configured to direct the system to determine the probability that the user goes to the historical destination at the current time point based on the corresponding average historical departure time.

In some embodiments, the at least one processor may further be configured to direct the system to determine a standard deviation of the corresponding one or more historical departure times. The at least one processor may also be configured to direct the system to determine a distribution function of the corresponding one or more historical departure times based on the standard deviation and the corresponding average historical departure time. The at least one processor may also be configured to direct the system to determine the probability that the user goes to the historical destination at the current time point based on the distribution function.

In some embodiments, the at least one processor may further be configured to direct the system to form a time vector for each of the corresponding one or more historical departure times. The at least one processor may also be configured to direct the system to form a time vector for each of the corresponding one or more historical departure times.

In some embodiments, the historical behavior information related to the user may include a plurality of point of interests (POIs) and one or more historical time points corresponding to each of the plurality of POIs. The at least one processor may further be configured to direct the system to determine a target time interval corresponding to the current time point. The at least one processor may also be configured to direct the system to determine, among the plurality of POIs, one or more candidate POIs corresponding to the target time interval based on the one or more time points corresponding to each of the plurality of POIs. The at least one processor may also be configured to direct the system to determine, among the one or more candidate POIs, the one or more recommended destinations for the user.

In some embodiments, the plurality of POIs may include at least one of a location searched by the user, a historical location the user has been to, a historical start location of a first historical service order initiated by the user, or a historical destination of a second historical service order initiated by the user.

In some embodiments, the plurality of POIs may include a plurality of locations searched by the user. The at least one processor may further be configured to direct the system to rank the one or more candidate POIs based on a number of times that each candidate POI is searched by the user. The at least one processor may also be configured to direct the system to determine, based on the ranking result of the one or more candidate POIs, the one or more recommended destinations.

In some embodiments, the plurality of POIs may include a plurality of historical locations the user has been to. For each of the one or more candidate POIs, the at least one processor may further be configured to direct the system to determine a second distance between the candidate POI and a current location of the user. The at least one processor may also be configured to direct the system to determine whether the second distance is greater than a second threshold distance. In response to a determination that the second distance is larger than the second threshold distance, the at least one processor may also be configured to direct the system to designate the candidate POI as one of the one or more recommended destinations.

In some embodiments, the at least one processor may further be configured to direct the system to obtain one or more public transportation routes near the requester terminal. The at least one processor may also be configured to direct the system to remotely control the interface of the user terminal, through the information exchange port, to display the one or more public transportation routes on the interface of the mobile device. The at least one processor may also be configured to direct the system to receive a user selection on the interface regarding the one or more public transportation routes. The at least one processor may also be configured to direct the system to store the user selection, the current location, and the target time interval into the at least one storage medium.

In another aspect of the present disclosure, a method for remotely operating an interface of a mobile device is provided. The method may include receiving a request for an LBS sent from the mobile device through an information exchange port. The method may also include obtaining a current time point in response to the request for the LBS and obtaining historical behavior information related to a user of the mobile device. The method may also include determining, based on the historical behavior information and the current time point, one or more recommended destinations for the user. Further, the method may include remotely controlling the interface of the mobile device, through the information exchange port, to display the one or more recommended destinations.

In another aspect of the present disclosure, a non-transitory computer readable medium is provided. The non-transitory computer readable medium may include executable instructions that, when executed by at least one processor, directs the at least one processor to perform a method, the method may include receiving a request for an LBS sent from a mobile device through an information exchange port. The method may also include obtaining a current time point in response to the request for the LBS. The method may also include obtaining historical behavior information related to a user of the mobile device. The method may also include determine, based on the historical behavior information and the current time point, one or more recommended destinations for the user. The method may also include remotely controlling an interface of the mobile device, through the information exchange port, to display the one or more recommended destinations.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 15 is a flowchart illustrating an exemplary process for recommending one or more routes for a user according to some embodiments of the present disclosure; and FIG. 16 is a flowchart illustrating an exemplary process for recommending one or more routes for a user according to some embodiments of the present disclosure.

DETAILED DESCRIPTION

Figure 1:
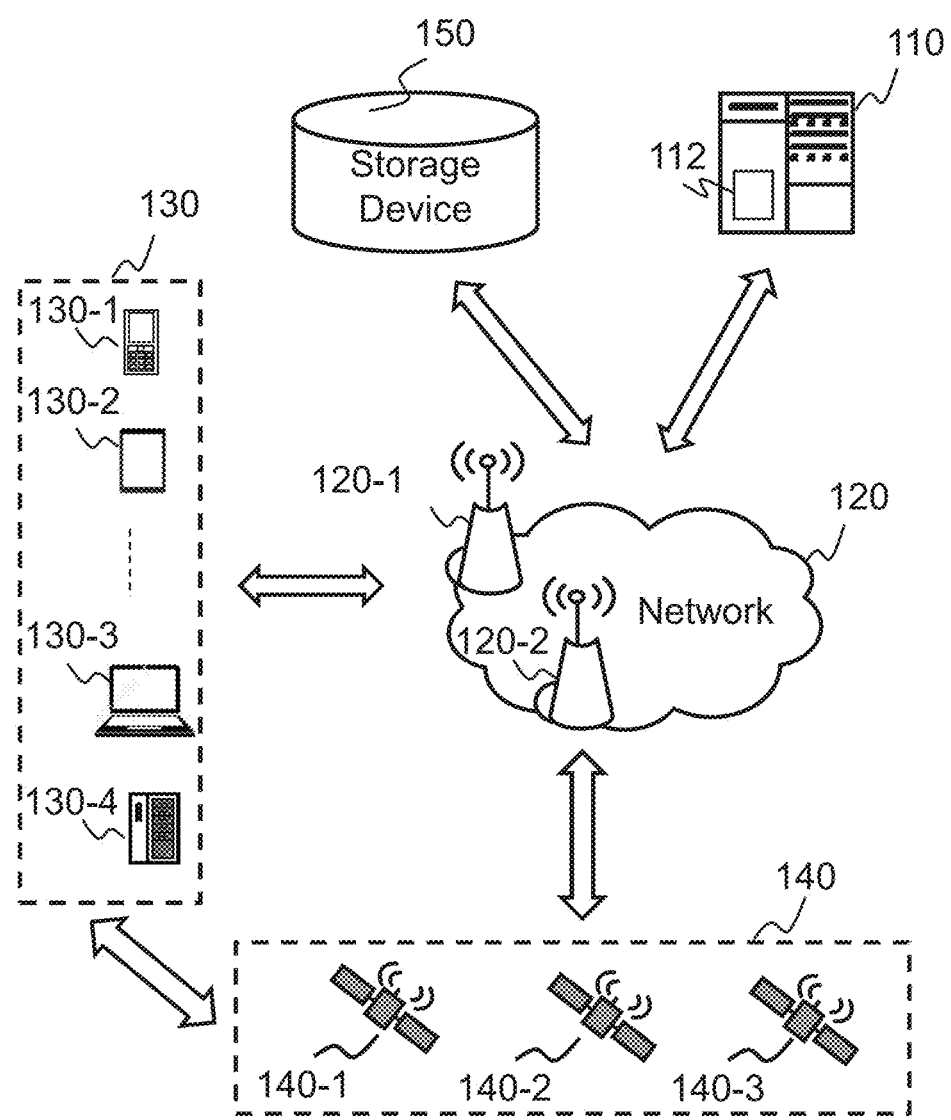
FIG. 1 is a schematic diagram illustrating an exemplary LBS system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods in the present disclosure are described primarily regarding recommending a destination to a passenger intending to ask for a taxi in a taxi-hailing service, it should also be understood that this is only one exemplary embodiment. The systems and methods in the present disclosure may be applied to any application scenario in which a user requires to search or input a location. In some embodiments, the systems and methods of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, a bicycle, a tricycle, a motorcycle, or the like, or any combination thereof. The systems and methods of the present disclosure may be applied to taxi hailing, chauffeur services, delivery service, carpool, bus service, take-out service, driver hiring, vehicle hiring, bicycle sharing service, train service, subway service, shuttle services, location service, map service, or the like. For example, the systems and methods in the present disclosure may be applied to a scenario, in which a user intends to search a location to head for in a navigation service. As another example, the systems and methods in the present disclosure may be applied to a scenario, in which a user intends to search a location for letter or package delivery in a delivery service. As still another example, the systems and methods in the present disclosure may be applied to a scenario, in which a user intends to search a location for take-out food delivery in a take-out service.

In some embodiments, when it is determined that a user intends to use an LBS, such as call for a taxi or navigate to a place using a mobile phone, an LBS platform communicating with the mobile phone may transmit a recommended destination to be displayed on the mobile phone. The recommended destination may match the user's intent destination to some extent such that a quick input of the destination is achieved. To this end, in response to a request for the LBS received from the mobile phone, the systems and methods may obtain a current time point and historical behavior information related to the user of the mobile phone. The historical behavior information may include but not limited to historical location information, search history, browse history, historical service order information of the user, which may indicate one or more locations that the user is interested in. Further, the systems and methods may determine one or more locations that the user may be interested in at the current time point based on the historical behavior information, and the one or more locations may be designated as recommended destinations for the user. The systems and methods may remotely control the interface of the mobile phone to display the recommended destination(s) to the user, such that the user may quickly select one of the recommended destination(s) without a manual input.

FIG. 1 is a schematic diagram of an exemplary LBS system 100 according to some embodiments of the present disclosure. The LBS system 100 may include a server 110, a network 120, a requester terminal 130, a positioning system 140, and a storage device 150. An LBS refers to any service related to location information. Exemplary LBSs may include a transportation service (for example, a taxi hailing service, a chauffeur service, an express car service, a carpool service, a bus service, a driver hire service, and a shuttle service), a post service, a food order service, a take-away service, a navigation service, a location search service, a location input service, a positioning service, or the like, or any combination thereof.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in a user terminal (e.g., the requester terminal 130), and/or the storage device 150 via the network 120. As another example, the server 110 may be directly connected to the user terminal (e.g., the requester terminal 130), and/or the storage device 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data to perform one or more functions described in the present disclosure. For example, the processing engine 112 may determine one or more recommended destinations for a user of the requester terminal 130. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the LBS system 100 (e.g., the server 110, the requester terminal 130, the storage device 150, and the positioning system 140) may send information and/or data to other component(s) in the LBS system 100 via the network 120. For example, the processing engine 112 may obtain historical behavior information related to a user (e.g. a service requester) from the storage device 150, and/or the requester terminal 130 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the LBS system 100 may be connected to the network 120 to exchange data and/or information.

In some embodiments, a service requester may be a user of the requester terminal 130. In some embodiments, the user of the requester terminal 130 may be someone other than the service requester. For example, a user A of the requester terminal 130 may use the requester terminal 130 to send a service request for a user B, or receive service and/or information or instructions from the server 114. In some embodiments, "service requester," "requester," and "requester terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass™, a RiftCon™, a Fragments™, a Gear VR™, etc. In some embodiments, the built-in device in the motor vehicle 130-4 may include an onboard computer, an onboard television, etc. In some embodiments, the requester terminal 130 may be a device with positioning technology for locating the position of the service requester and/or the requester terminal 130.

The positioning system 140 may determine location information associated with an object. For example, the positioning system 140 may determine a location of the requester terminal 130 in real time. In some embodiments, the positioning system 140 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, an accumulative mileage number, or a current time. The location may be in the form of coordinates, such as, latitude coordinate and longitude coordinate, etc. The positioning system 140 may include one or more satellites, for example, a satellite 140-1, a satellite 140-2, and a satellite 140-3. The satellites 140-1 through 140-3 may determine the location information mentioned above independently or jointly. The satellite positioning system 140 may send the information mentioned above to the network 120, or the user terminal (e.g., the requester terminal 130) via wireless connections.

The storage device 150 may store data and/or instructions. In some embodiments, the storage device 150 may store data obtained from the requester terminal 130 and/or the server 110. For example, the storage device 150 may store historical behavior information related to a user of the requester terminal 130. In some embodiments, the storage device 150 may store data and/or instructions that the server 110 may execute or use to perform exemplary methods described in the present disclosure. For example, the storage device 150 may store instructions that the processing engine 112 may execute to determine one or more recommended destinations for the user of the requester terminal 130. In some embodiments, the storage device 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components in the LBS system 100 (e.g., the server 110, the requester terminal 130, and/or the positioning system 140). One or more components in the LBS system 100 may access the data or instructions stored in the storage device 150 via the network 120. In some embodiments, the storage device 150 may be directly connected to or communicate with one or more components in the LBS system 100 (e.g., the server 110, the requester terminal 130, the positioning system 140). In some embodiments, the storage device 150 may be part of the server 110.

Figure 2:
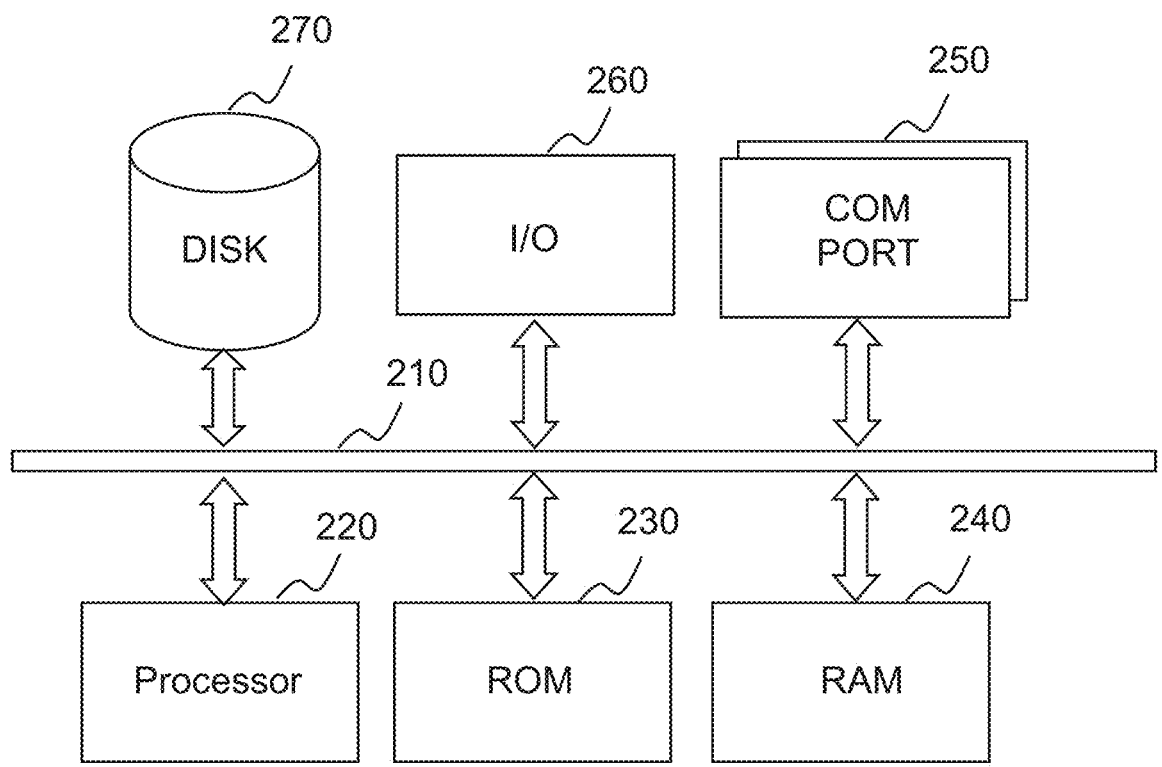
FIG. 2 is a schematic diagram illustrating exemplary hardware and/or software components of a computing device on which a processing engine may be implemented according to some embodiments of the present disclosure.

FIG. 2 is a schematic diagram illustrating exemplary hardware and software components of a computing device 200 on which the server 110, the service requester terminal 130 may be implemented according to some embodiments of the present disclosure. For example, the processing engine 112 may be implemented on the computing device 200 and configured to perform functions of the processing engine 112 disclosed in this disclosure.

The computing device 200 may be a special purpose computer in some embodiments. The computing device 200 may be used to implement an LBS system for the present disclosure. The computing device 200 may implement any component of the LBS as described herein. In FIGS. 1-2, only one such computer device is shown purely for convenience purposes. One of ordinary skill in the art would understood at the time of filing of this application that the computer functions relating to the LBS as described herein may be implemented in a distributed fashion on a number of similar platforms, to distribute the processing load.

The computing device 200, for example, may include a communication (COM) port 250 connected to and from a network connected thereto to facilitate data communications. The COM port 250 may establish connections between the computing device 200 and the user terminal (e.g., the requester terminal 130), the positioning system 140, or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the COM port 250 may be and/or include a standardized communication port, such as RS232, RS485, etc.

The computing device 200 may also include a central processing unit (CPU, or processor) 220, in the form of one or more processors, for executing program instructions. The exemplary computer platform may include an internal communication bus 210, a program storage and a data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or other type of non-transitory storage medium to be executed by the CPU/processor 220. The methods and/or processes of the present disclosure may be implemented as the program instructions. The computing device 200 may also include an I/O component 260, supporting input/output between the computer and other components therein such as a user interface element (not shown in FIG. 2). The computing device 200 may also receive programming and data via network communications.

Merely for illustration, only one CPU/processor 220 is described in the computing device 200. However, it should be note that the computing device 200 in the present disclosure may also include multiple CPUs/processors, thus operations and/or method steps that are performed by one CPU/processor 220 as described in the present disclosure may also be jointly or separately performed by the multiple CPUs/processors. For example, if in the present disclosure the CPU/processor 220 of the computing device 200 executes both step A and step B, it should be understood that step A and step B may also be performed by two different CPUs/processors jointly or separately in the computing device 200 (e.g., the first processor executes step A and the second processor executes step B, or the first and second processors jointly execute steps A and B).

Figure 3:
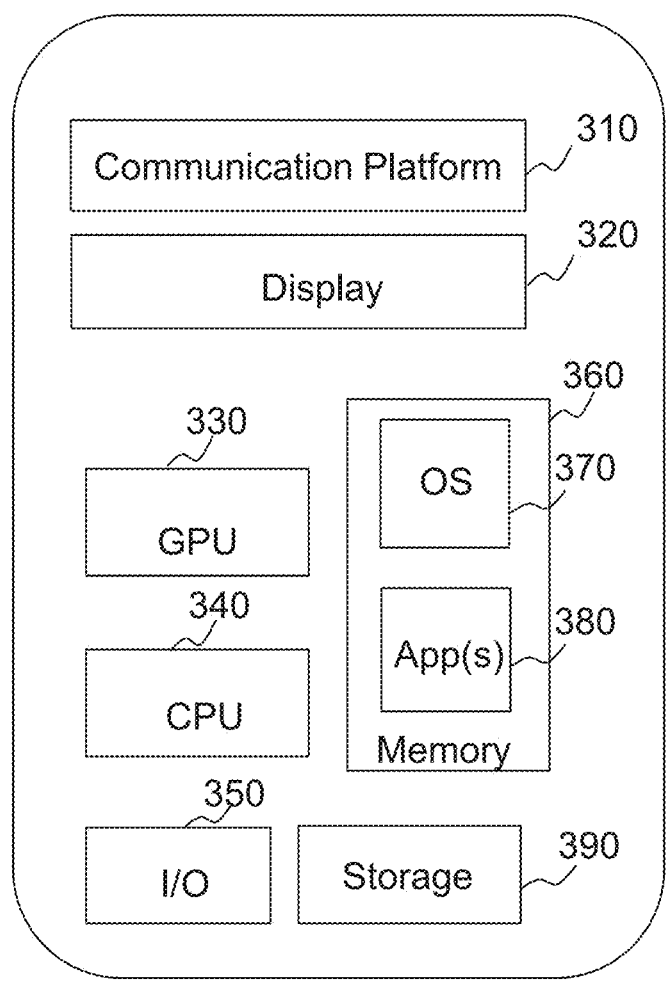
FIG. 3 is a schematic diagram illustrating exemplary hardware and/or software components of a mobile device on which one or more terminals may be implemented according to some embodiments of the present disclosure.

FIG. 3 is a schematic diagram illustrating exemplary hardware and/or software components of a mobile device on which a user terminal (e.g., the requester terminal 130) may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 (e.g., a taxi-hailing application) may include a browser or any other suitable mobile apps for receiving and rendering information relating to transportation services or other information from the processing engine 112. User interactions with the information stream may be achieved via the I/O 350 and provided to the processing engine 112 and/or other components of the LBS system 100 via the network 120. Merely by way of example, a user (e.g., a service requester) may input a start location through the I/O 350. As another example, a recommended destination may be displayed and/or broadcast to the user via the I/O 350 and/or the display 320.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

One of ordinary skill in the art would understand that when an element of the LBS system 100 performs, the element may perform through electrical signals and/or electromagnetic signals. For example, when the processing engine 112 processes a task, such as making a determination, or identifying information, the processing engine 112 may operate logic circuits in its processor to process such task. When the processing engine 112 receives data (e.g., a location of a service requester/provider) from the user terminal (e.g., the requester terminal 130), a processor of the processing engine 112 may receive electrical signals encoding/including the data. The processor of the processing engine 112 may receive the electrical signals through an input port. If the user terminal (e.g., the requester terminal 130) communicates with the processing engine 112 via a wired network, the input port may be physically connected to a cable. If the user terminal (e.g., the requester terminal 130) communicates with the processing engine 112 via a wireless network, the input port of the processing engine 112 may be one or more antennas, which may convert the electrical signals to electromagnetic signals. Within an electronic device, such as the user terminal (e.g., the requester terminal 130), and/or the server 110, when a processor thereof processes an instruction, sends out an instruction, and/or performs an action, the instruction and/or action is conducted via electrical signals. For example, when the processor retrieves or saves data from a storage medium (e.g., the storage device 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 4A:
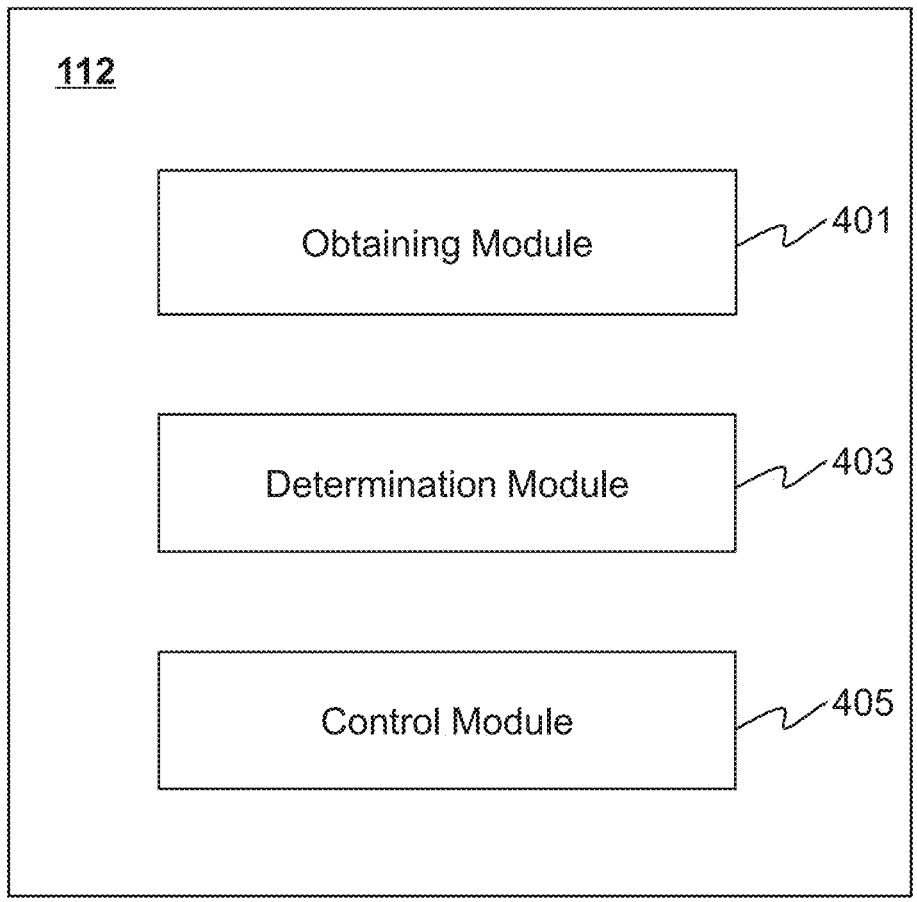
FIG. 4A is a schematic block diagram illustrating an exemplary processing engine according to some embodiments of the present disclosure.

FIG. 4A is a schematic block diagram illustrating an exemplary processing engine 112 according to some embodiments of the present disclosure. The processing engine 112 may include an obtaining module 401, a determination module 403, and a control module 405.

The obtaining module 401 may be configured to obtain information related to the LBS system 100. The information may include, for example, a request for an LBS sent by a user, a current time point in response to the request for the LBS, historical behavior information related to the user, or the like, or any combination thereof. Details regarding the information related to the requester and/or the user, the current time point may be found elsewhere in the present disclosure (e.g., operations 410 to 430 and the relevant descriptions thereof).

The determination module 403 may be configured to determine one or more recommended destinations for the user based on the historical behavior information and the current time point. In some embodiments, the historical behavior information may indicate one or more POIs that the user might be interested in, such as but not limited to a location searched by the user, a historical location the user has been to, a historical start location, and/or a historical destination of a historical service order initiated by the user. The determination module 403 may determine one or more of the locations that the user might go to at the current time point among the POI(s). The location(s) that the user might go to at the current time point may be designated as the recommended destination(s). Details regarding the determination of the recommended destination(s) may be found elsewhere in the present disclosure (e.g., operation 440 and the relevant descriptions thereof).

The control module 405 may be configured to remotely control an interface of a mobile device. For example, the control module 405 may remotely control the interface of the mobile device to display one or more recommended destinations. In some embodiments, the control module 405 may remotely control an interface of the mobile device by transmitting an instruction to the mobile device via an information exchange port. The instruction may operate the mobile device to display the recommended destinations(s). The instruction may include, for example, the recommended destination(s) to be displayed, the form of displaying, or the like, or any combination thereof. Details regarding the control of the interface of the mobile device may be found elsewhere in the present disclosure (e.g., operation 450 and the relevant descriptions thereof).

It should be noted that the above description regarding the processing engine 112 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing engine 112 may further include a storage module (not shown in FIG. 4A) configured to store data generated during any process performed by any component of in the processing engine 112.

Figure 4B:
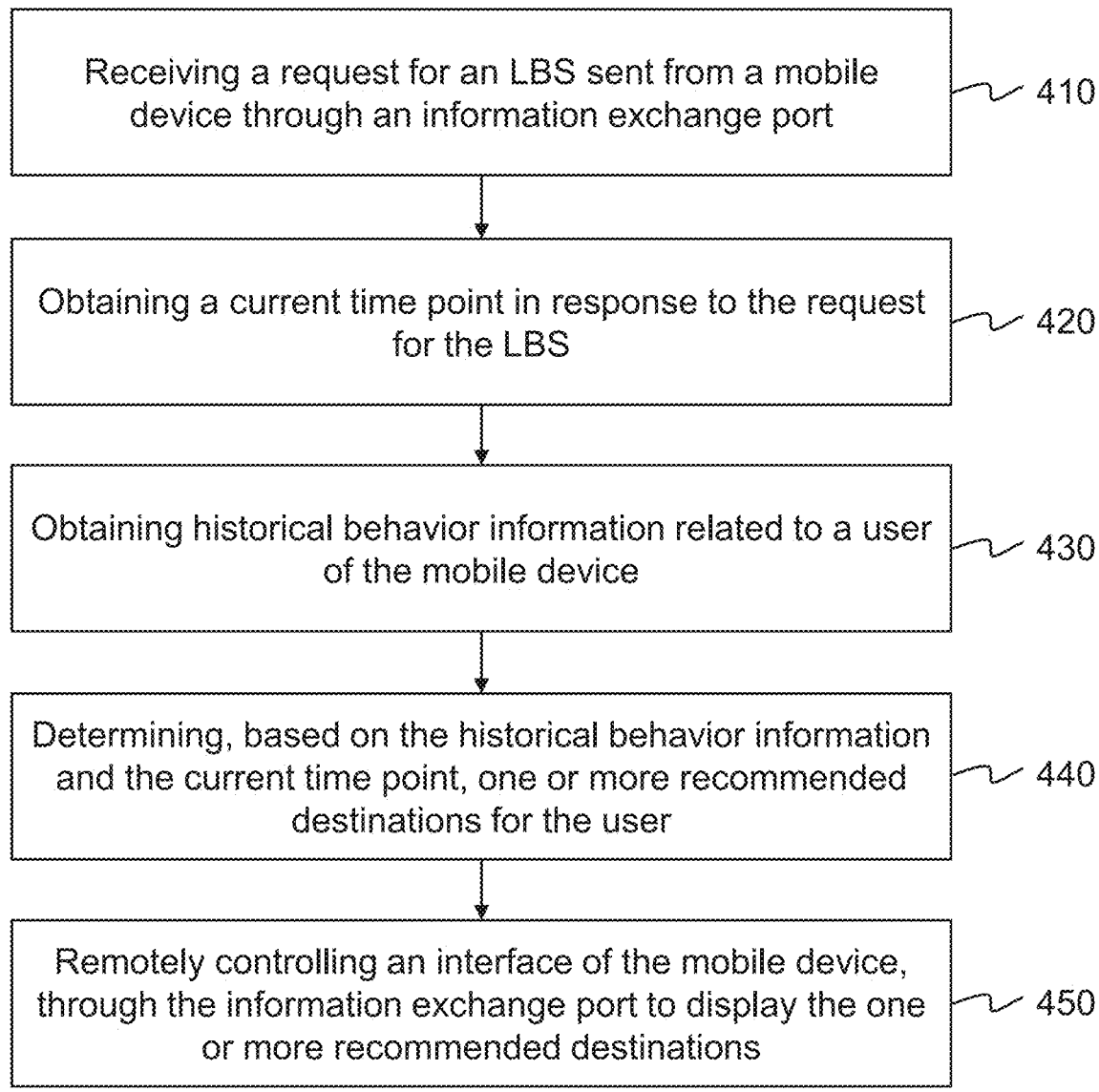
FIG. 4B is a flowchart illustrating an exemplary process for recommending one or more destinations for a user according to some embodiments of the present disclosure.

FIG. 4B is a flowchart illustrating an exemplary process for recommending one or more destinations for a user according to some embodiments of the present disclosure. In some embodiments, process 400 may be implemented in the LBS system 100 illustrated in FIG. 1. For example, the process 400 may be stored in a storage medium (e.g., the storage device 150, the ROM 230, the RAM 240, the storage 390) as a form of instructions, and invoked and/or executed by the server 110 (e.g., the processing engine 112 of the server 110, the processor 220 of the computing device 200), a terminal device (e.g., the requester terminal 130), a device for recommending destinations (e.g., any one of devices 500A to 500E).

In 410, the processing engine 112 (e.g., the obtaining module 401) may receive a request for an LBS sent from a mobile device through an information exchange port (e.g., the COM port 250).

The LBS may include any service related to location information. Particularly, the LBS may refer to a service to determine or recommend a location associated with a user (e.g., a user of the mobile device) or an object (e.g., the mobile device). The location to be determined or recommended may include any location, such as, a current location, a start location, a destination, a point of interest (POI) of the user or the object. A POI of the user may refer to a location that the user may be interested in. For illustration purposes, the present disclosure takes a destination as an example of the location to be determined or recommended in the LBS. It should be understood that this is only an exemplary embodiment. The systems and methods in the present disclosure may be applied in any LBS in which a location other than the destination, such as a start location, a current location, or a POI is to be determined or recommended.

In some embodiments, the request for the LBS may be input by a user of the mobile device via an interface of the mobile device, Merely by way of example, the user may input a request for recommended destinations by typing in at least partial words of a destination via the interface and/or recording a destination word via a microphone. In some embodiments, the request for the LBS may be sent to the processing engine 112 by the mobile device automatically when the user performs a predetermined action. For example, the request for LBS may be sent to the processing engine 112 when the user opens an application for LBS (e.g., an application for car hailing, a navigation application) installed in the mobile device. As another example, the request for LBS may be sent to the processing engine 112 when the user clicks a location input or search box and intends to input a location.

In some embodiments, the request for the LBS may be sent to the processing engine 112 when the user of the mobile device uses an Online to Offline (O2O) service, such as a transportation service (for example, a taxi hailing service, a chauffeur service, an express car service, a carpool service, a bus service, a driver hire service, and a shuttle service), a post service, a food order service, a take-away service, or the like, or any combination thereof. Merely by way of example, a user may need to input a destination to call a taxi (e.g., using a taxi-hailing application installed in the passenger's smart phone) or use a navigation service. The request for the LBS may be automatically generated and sent to the processing engine 112 by the mobile device upon detecting that the user clicks a location input box. In response to the received request for LBS, the processing engine 112 may automatically perform the process 400 to recommend one or more destinations for the user. As such, a quick response to the user's request and a recommendation that matches the user's intent are achieved.

The information exchange port may establish connection between the mobile device and the processing engine 112. The connection may be a wired connection, a wireless connection, any other communication connection that can enable data transmission and/or reception, and/or any combination of these connections. In some embodiments, the information exchange port may be similar to the COM 250 described in FIG. 2, and the descriptions thereof are not repeated here.

In 420, the processing engine 112 (e.g., the obtaining module 401) may obtain a current time point in response to the request for the LBS.

Typically, a user goes to different locations at different time of the day, for example, workplace at morning and home at night. The current time point when the request for the LBS is received may be used in the destination recommendation, making the recommendation more accurate and effective. In some embodiments, in 420, the obtaining module 401 may obtain a time point other than the current time point, for example, the actual departure time. For example, the user may reserve a car to travel at a reserved time other than the current time, and the recommended destination may be determined based on the reserved time.

In 430, the processing engine 112 (e.g., the obtaining module 401) may obtain historical behavior information related to the user of the mobile device.

The historical behavior information may be used to analyze a historical behavior of the user, from which, a POI of the user may be inferred. The POI of the user may include a historical location the user has been to, a location searched by the user, a location browsed by the user, a historical start location of a historical service order initiated by the user, a historical destination of a historical service order imitated by the user, or the like, or any combination thereof. The historical behavior information may include historical location information, search history, browsing history, historical service order(s) (e.g., historical car hailing service orders) of the user, or the like, or any combination thereof.

The historical location information may include a historical location that the user has been to, a historical time point when the user was at the historical location, a frequency that the user went to the historical location, or the like, or any combination thereof. The search history may include a location searched by the user, a search time when the user searched for the location, times that the location has been searched by the user, or the like, or any combination thereof. The browsing history may include a location browsed by the user, a browse time when the user browsed the location, times that the location has been browsed, or the like, or any combination thereof. The historical service information may include a historical start location, a historical destination, a historical time point when the historical service order was initiated or completed, or the like, or any combination thereof. The historical service order(s) of the user may include a transportation service, a post service, a food order service, a take-away service, or the like, or any combination thereof. When a historical service order was initiated, the user may need to input a start location and/or a destination of the service, and the start location and the destination may be regarded as a POI of the user. In some embodiments, the historical behavior information related to a transportation service may also be referred to as historical travel information.

In some embodiments, the historical behavior information related to the user may be associated with a predetermined period (e.g., several certain months ago, certain years ago, or certain days ago). Merely by way of example, the historical behavior information may include historical service orders that have been completed for example, within last year, during daytime in the last year, or the like.

In 440, the processing engine 112 (e.g., the determination module 403) may determine one or more recommended destinations for the user based on the historical behavior information and the current time point.

In some embodiments, as described in connection with operation 430, the historical behavior information may indicate one or more POIs that the user might be interested in, such as but not limited to a location searched by the user, a historical location the user has been to, a historical start location, and/or a historical destination of a historical service order initiated by the user. The determination module 403 may determine one or more of the locations that the user might go to at the current time point among the POI(s). The location(s) that the user might go to at the current time point may be designated as the recommended destination(s).

In some embodiments, the determination module 403 may determine a probability that the user goes to each POI at the current time point based on the historical behavior information. The determination module 403 may further determine the recommended destination(s) based on the probabilities. For example, the determination module 403 may designate a POI with the corresponding probability greater than a threshold as a recommended destination. As another example, the determination module 403 may designate a POI having the highest probability among all POI(s) as a recommended destination.

In some embodiments, the historical behavior information may include one or more historical time points corresponding to each POI. For example, the historical behavior information may include a search time of a location (or POI) when it was searched by the user, a time point when the user was at a location (or POI), or a time point when the user initiated a historical service to travel to a location. The determination module 403 may divide the current time point into a target time interval, and determine one or more POIs that the user might go to at the target time interval based on the historical time points corresponding to each POI. The one or more POIs that the user might go to at the target time interval may be designated as one or more recommended destinations of the user. As used herein, the target time interval refers to any time interval that includes the current time point. For example, if the current time point is 12:30, the target time interval may be 12:00 to 13:00 p.m., 11:00 to 13:00, or the like. More detailed description of the determination of the one or more recommended destinations can be found elsewhere in the present disclosure (e.g., FIGS. 6 to 8, 12 to 14, and the descriptions thereof).

In 450, the processing engine 112 (e.g., the control module 405) may remotely control the interface of the mobile device, through the information exchange port, to display the one or more recommended destinations.

In some embodiments, the control module 405 may remotely control an interface of the mobile device by transmitting an instruction to the mobile device via the information exchange port. The instruction may operate the mobile device to display the recommended destinations(s). The instruction may include, for example, the recommended destination(s) to be displayed, the form of displaying, or the like, or any combination thereof.

In some embodiments, the mobile device may be controlled to display the recommended destination(s) in the form of voice, text, graph, image, or the like, or any combination thereof. For example, the mobile device may be controlled to display the recommended destination(s) on a map with one or more labels indicating the recommended destination(s). As another example, the mobile device may be controlled to display the recommended destination(s) as a list.

In some embodiments, the processing engine 112 (e.g., the determination module 403) may rank the recommended destination(s). The processing engine 112 (e.g., the control module 405) may further remotely control the interface of the mobile device to display the recommended destination(s) according to the ranking result. For example, as described in connection with operation 440, the recommended destination(s) may be determined among a plurality of POIs of the user according to the probabilities that the user goes to each POI at the current time point. The recommended destination(s) may be ranked based on the corresponding probabilities, for example, in a descending order. As another example, the recommended destination(s) may be ranked according to the frequency that they were, for example, visited, searched, browsed, set as a destination and/or start location by the user in a descending order. In some embodiments, the recommended destinations may be displayed in different ways based on the ranking result. For example, a recommended destination with a higher ranking may be displayed in front of a recommended destination with a lower ranking. As another example, top 3 recommended destinations in the ranking result may be displayed in red and other recommended destination(s) may be displayed in grey.

It should be noted that the above description regarding the process 400 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure.

In some embodiments, the process 400 may be accomplished with one or more additional operations not described, and/or without one or more of the operations discussed. Additionally, the order in which the operations of the process 400 as illustrated in FIG. 4B and described below is not intended to be limiting. For example, after operation 450, the processing engine 112 may receive a user selection of one of the recommended destination(s) from the mobile device. The processing engine 112 may further transmit one or more routes to reach the selected recommended destination to the mobile device for display. One or more operations may be removed from process 400. As another example, operation 420 may be omitted. The processing engine 112 may determine the recommended destination(s) based on the historical behavior information of the user. Merely by way of example, the processing engine 112 may rank the one or more POIs included in the historical behavior information according to a frequency value that each POI was visited, searched, browsed, set as a destination and/or a start location by the user. The processing engine 112 may determine the recommended destination(s) based on the ranking result. For example, a POI whose corresponding frequency value is equal to or larger than a preset threshold may be designated as one of the recommended destination(s).

Figure 5A:
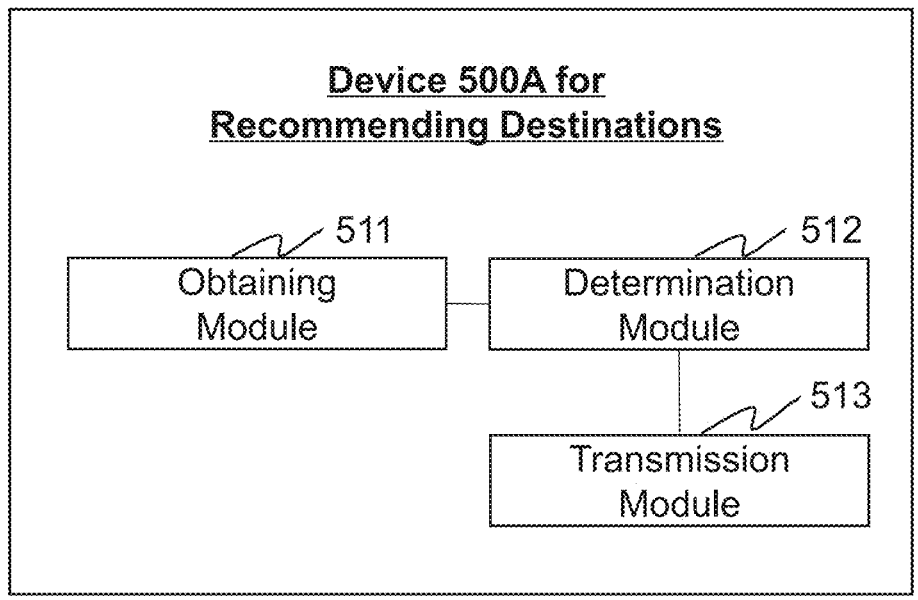
FIGS. 5A-5E are schematic block diagrams illustrating exemplary devices for determining recommended destinations according to some embodiments of the present disclosure.

FIG. 5A is a schematic block diagram illustrating an exemplary device 500A for recommending destinations according to some embodiments of the present disclosure. The device 500A may exist independently, or be integrated into a terminal device (e.g., the requester terminal 130) or the server 110 (for example, as a component of the processing engine 112). The device 500A may be implemented on software and/or hardware. The device 500A may include an obtaining module 511, a determination module 512, and a transmission module 513.

The obtaining module 511 may be configured to obtain historical travel information related to a user. The historical travel information may include a plurality of historical departure times and a historical destination corresponding to each historical departure time.

The determination module 512 may be configured to determine a probability that the user goes to the historical destination at a current time point based on the plurality of historical departure times and the historical destination corresponding to each historical departure time. In some embodiments, the determination module 512 may further be configured to determine one or more recommended destinations corresponding to the current time point based on the probabilities corresponding to the plurality of historical destinations.

In some embodiments, the determination module 512 may be configured to obtain a time point other than the current time point, for example, a scheduled time point when the user is scheduled to go to a destination. The determination module 512 may determine a probability that the user goes to each of the historical destination(s) at the scheduled time. The determination module 512 may further determine one or more recommended destinations corresponding to the schedule time point based on the probabilities that the user goes to each historical destination at the schedule time.

The transmission module 513 may be configured to transmit the recommended destination(s) to the user. For example, the recommended destination(s) may be displayed in an application for car hailing.

Figure 5B:
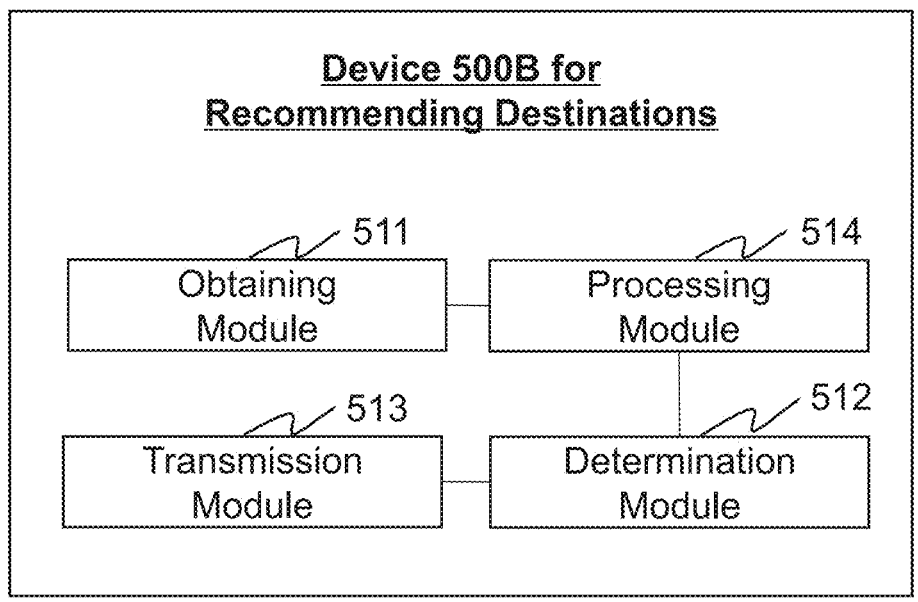

FIG. 5B is a schematic block diagram illustrating an exemplary device 500B for recommending destinations according to some embodiments of the present disclosure. The device 500B may be an embodiment of the device 500A and further include a processing module 514.

The processing module 514 may be configured to merge historical destinations based on geographic information related to the historical destinations. The processing module 514 may further be configured to determine a probability that the user goes to each of the merged historical destinations at a current time.

Figure 5C:
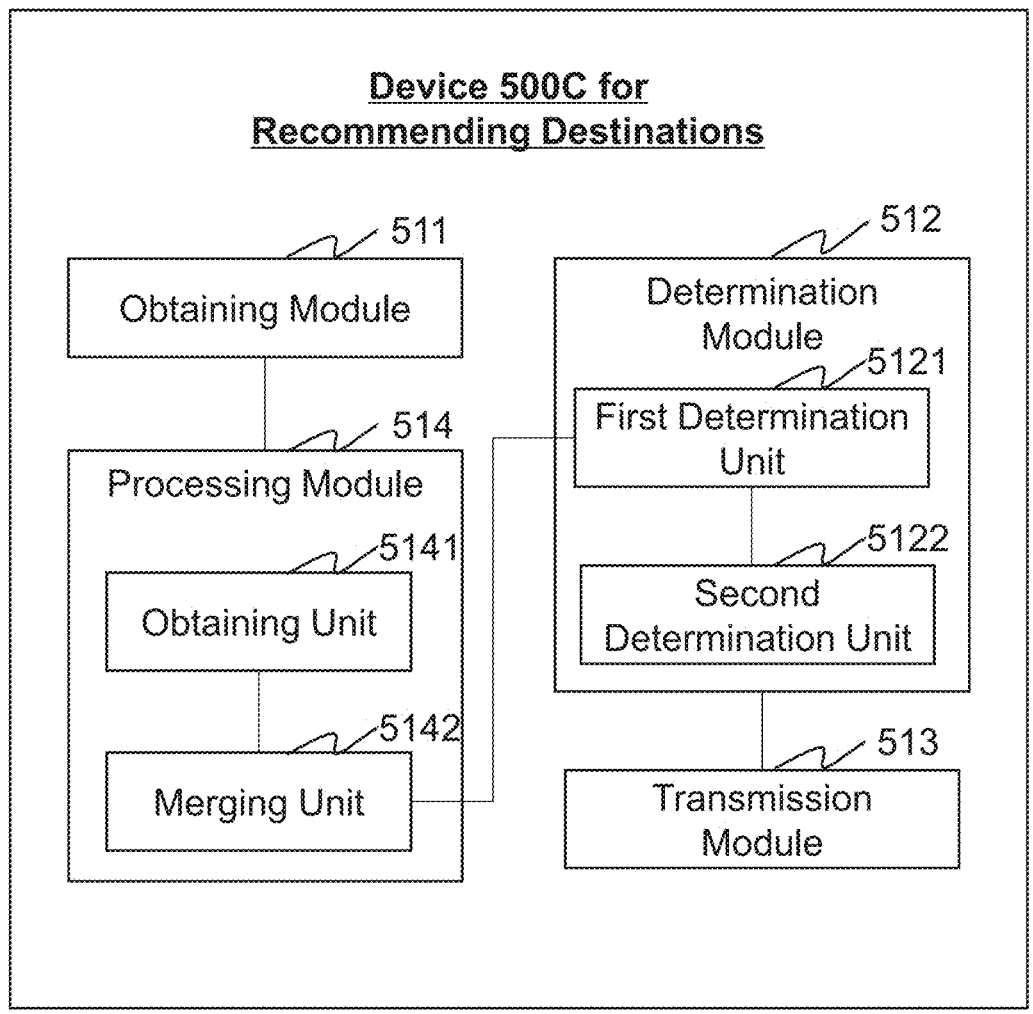

FIG. 5C is a schematic block diagram illustrating an exemplary device 500C for recommending destinations according to some embodiments of the present disclosure. The device 500C may be an embodiment of the device 500B in which the determination module 512 may further include a first determination unit 5121 and a second determination unit 5122.

The first determination unit 5121 may be configured to determine an average departure time that the user went to a historical destination based on the corresponding historical departure time(s) of the historical destination.

In some embodiments, for each historical destination, the first determination unit 5121 may transform each corresponding historical departure time into a time vector. The time vector may represent a historical time point in a vector form. Then, the first determination unit 5121 may sum the time vector(s) corresponding to the historical destination, and determine the corresponding average departure time accordingly. In some embodiments, the first determination unit 5121 may determine an average departure time based on the historical departure time(s) of the historical destination according to an arithmetic mean value-based method. Details regarding the arithmetic mean value-based method may be found elsewhere in the present disclosure (e.g., Equation (5) in FIG. 8 and the relevant descriptions thereof).

The second determination unit 5122 may be configured to determine a probability that the user goes to each of the historical destinations at the current time point based on the corresponding average departure time.

In some embodiments, the second determination unit 5122 may determine a standard deviation of the corresponding historical departure time(s) for a historical destination. The second determination unit 5122 may also determine a distribution function of the historical departure time(s) corresponding to the historical destination based on the standard deviation and the average departure time. The second determination unit 5122 may then determine the probability that the user goes to the historical destination at the current time point based on the distribution function.

In some embodiments, the determination module 512 may also be configured to designate a historical destination with the corresponding probability greater than a preset threshold as a recommended destination. Alternatively, the determination module 512 may determine a historical destination with a largest probability as a recommended destination corresponding to the current time point.

In some embodiments, the processing module 514 may further include an obtaining unit 5141 and a merging unit 5142.

The obtaining unit 5141 may be configured to obtain first geographic information of a first historical destination and second geographic information of a second historical destination. The first historical destination and the second historical destination may be two different destinations among the historical destinations of the user.

The merging unit 5142 may be configured to merge the first historical destination and the second historical destination as a same historical destination if the distance between them is not greater than a preset threshold.

Figure 5D:
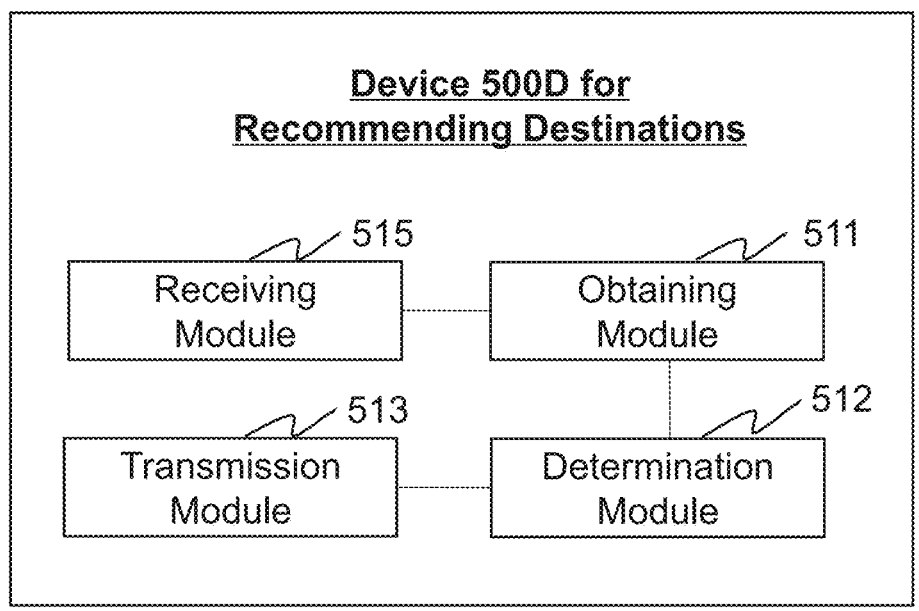

FIG. 5D is a schematic block diagram illustrating an exemplary device 500D for recommending destinations according to some embodiments of the present disclosure. The device 500D may be an embodiment of the device 500A and further include a receiving module 515.

The receiving module 515 may be configured to receive an instruction triggered and/or inputted by the user before obtaining the historical travel information related to the user. The instruction may instruct the device 500D to obtain one or more recommended destinations corresponding to the current time point.

Figure 5E:
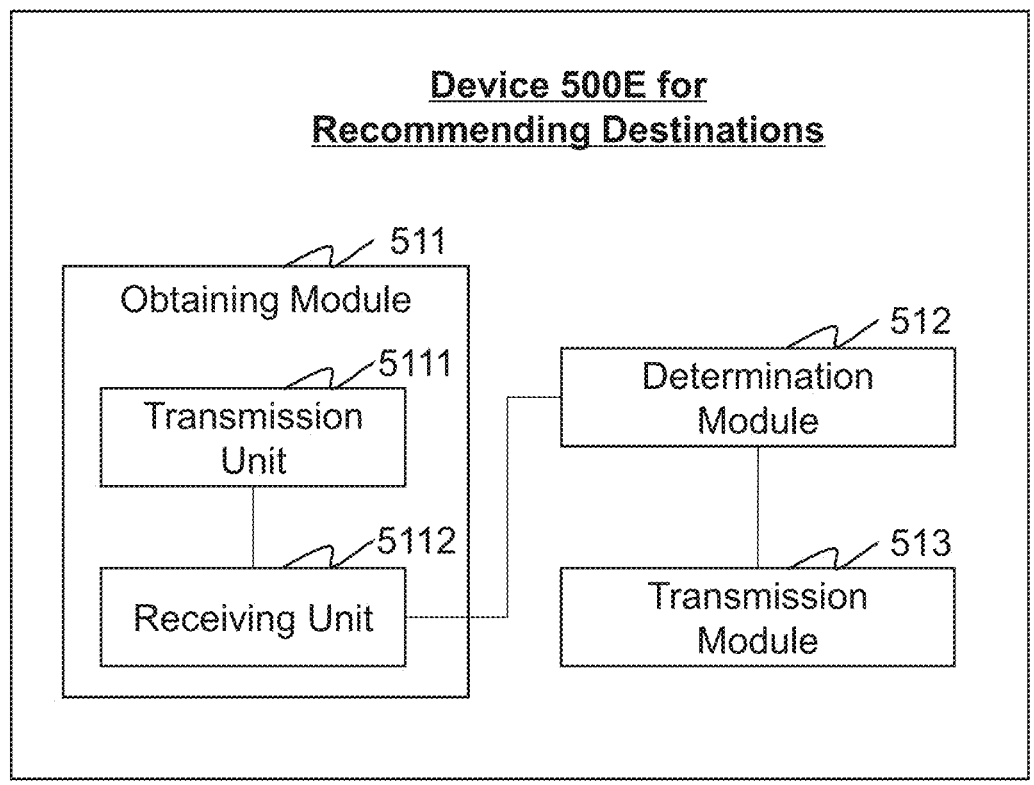

FIG. 5E is a schematic block diagram illustrating an exemplary device 500E for recommending destinations according to some embodiments of the present disclosure. The device 500E may be an embodiment of the device 500A in which the obtaining module 511 may further include a transmission unit 5111 and a receiving unit 5112.

The transmission unit 5111 may be configured to transmit a request for obtaining the historical travel information related to the user to the server 110. The request may include a user identification.

The receiving unit 5112 may be configured to receive the historical travel information based on the user identification from the server 110. Details regarding the obtaining and receiving of the historical travel information may be found elsewhere in the present disclosure (e.g., operation 601 and the relevant descriptions thereof).

It should be noted that the above descriptions regarding the devices 500A to 500E are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, any of the devices 500A to 500E may include one or more additional modules (e.g., a storage module). As another example, any module of the devices 500A to 500E may be omitted. As yet another example, any two or more modules of a destination recommending device (e.g., any one of devices 500A to 500E) may be integrated into one module to perform the functions thereof.

Figure 6:
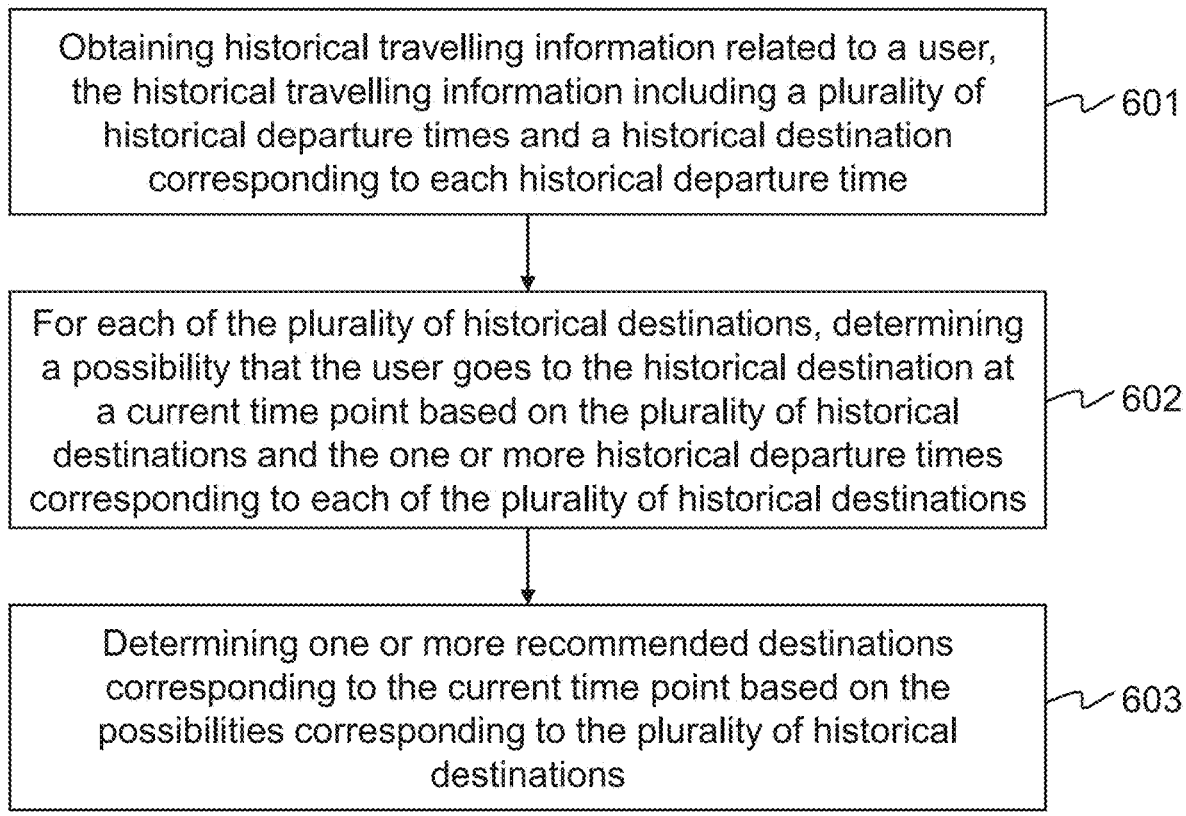
FIG. 6 is a flowchart illustrating an exemplary process for determining one or more recommended destinations according to some embodiments of the present disclosure.

FIG. 6 is a flowchart illustrating an exemplary process for determining one or more recommended destinations according to some embodiments of the present disclosure. In some embodiments, the process 600 may be performed by any device for recommending destinations (e.g., any of the devices 500A to 500E). The device for recommending destinations may be implemented on software and/or hardware. In some embodiments, the device for recommending destinations may be integrated into a terminal device (e.g., the requester terminal 130) or the server 110 (for example, as a component of the processing engine 112). In some embodiments, the process 600 may be stored in a storage medium (e.g., the storage device 150, the ROM 230, the RAM 240, the storage 390) as a form of instructions, and invoked and/or executed by the server 110 (e.g., the processing engine 112 of the server 110, the processor 220 of the computing device 200), the device for recommending destinations, or a terminal device (e.g., the requester terminal 130). For illustration purposes, the implementation of the process 600 on the device 500A is described as an example.

In 601, the device 500A may obtain historical travel information related to a user. The historical travel information may include a plurality of historical departure times and a historical destination corresponding to each historical departure time.

As described in 430, the historical travel information may be associated with one or more historical transportation service orders initiated by the user. For each historical transportation service order, the corresponding historical travel information may include a historical start location, a historical destination, a historical departure time, a historical arrival time, or the like, or any combination thereof. The historical departure time of a historical transportation service order refers to a time point when the historical transportation service order was started and the user started for the historical destination. The historical arrival time of a historical transportation service order refers to a time point when the historical transportation service order was completed and the user arrived at the historical destination.

In some embodiments, the device 500A may obtain the historical travel information from an external source via the network 120, and/or from one or more components of the LBS system 100, such as a terminal device (e.g., the request terminal 130), and/or a storage device (e.g., the storage device 150, the storage 220).

The historical travel information may include a plurality of historical departure times, each corresponding to a historical destination. In some embodiments, a historical destination may correspond to a plurality of historical departure times. For example, a user started for Zhongguancun Software Park at 10:05 on Dec. 10, 2015 and 15:58 on Dec. 10, 2015. In such case, the historical departure times corresponding to Zhongguancun Software Park may include 10:05 on Dec. 10, 2015 and 15:58 on Dec. 10, 2015.

The historical destination(s) may correspond to the historical departure times within the preset time period, e.g., in the past month. The preset time period may be set as a month, half of a year, etc. In some embodiments, the preset time period may be a default parameter stored in a storage device (e.g., the storage device 150) or be set manually by a user via a terminal device (e.g., the requester terminal 130).

In some embodiments, the device 500A may obtain the historical travel information based on the process as follows. The device 500A may transmit a request for obtaining the historical travel information related to the user to the server 110. The request may include a user identification. The device 500A may further receive the historical travel information based on the user identification from the server 110.

Specifically, the device 500A may transmit the request including the user identification to the server 110. The user identification may be used to identify the user. For example, the user identification may include a phone number, a name user, an identification card number, a QR code, a fingerprint, a face image of the user, or the like, or any combination thereof. After receiving the request, the server 110 may analyze the request to determine the user identification from the request, and retrieve the historical travel information based on the user identification from a database (e.g., the storage device 150 of the LBS system 100). The server 110 may transmit the historical travel information to the device 500A if the historical travel information is retrieved. On the other hand, the server 110 may transmit a notification indicating that the historical travel information is not retrieved to the device 500A if it fails to retrieve the historical travel information.

In 602, for each of the plurality of historical destinations, the device 500A may determine a probability that the user goes to the historical destination at a current time point based on the plurality of historical departure times and the historical destination corresponding to each historical departure time.

In some embodiments, the current time point refers to a time point when the device 500A obtains the historical travel information related to the user. After obtaining the historical travel information related to the user, the device 500A may determine the probability that the user goes to each of the historical destination(s) at the current time point based on the historical departure time(s) and the historical destination corresponding to each historical departure time.

As an alternative approach of operation 602, the device 500A may obtain a time point other than the current time point, for example, a time point when the user is scheduled to go to a destination. Merely by way of example, the user may reserve a car at a scheduled time. The device 500A may obtain the appointment time and determine a probability that the user goes to each of the historical destination(s) at the scheduled time.

For example, the historical departure times and the corresponding historical destinations obtained by the device 500A may be illustrated in Table 1:

TABLE 1

| | |
|---|---|
| 10:05, Dec. 10, 2015 | Gate 6, Zhongguancun Software Park |
| 15:58, Dec. 10, 2015 | Gate 6, Zhongguancun Software Park |
| 18:52, Dec. 10, 2015 | Building 1, Jinguyuan |
| 18:57, Dec. 11, 2015 | Building 1, Jinguyuan |
| 9:43, Dec. 11, 2015 | Gate 6, Zhongguancun Software Park |
| 10:05, Dec. 14, 2015 | Gate 6, Zhongguancun Software Park |
| 20:27, Dec. 14, 2015 | Building 1, Jinguyuan |
| 9:57, Dec. 14, 2015 | Gate 6, Zhongguancun Software Park |
| 18:02, Dec. 15, 2015 | Building 1, Jinguyuan |
| 19:00, Dec. 15, 2015 | Zhichuan Road |
| 21:03, Dec. 15, 2015 | Building 1, Jinguyuan |
| 9:54, Dec. 15, 2015 | Gate 6, Zhongguancun Software Park |
| 19:18, Dec. 16, 2015 | Building 1, Jinguyuan |
| 9:56, Dec. 16, 2015 | Gate 6, Zhongguancun Software Park |
| 18:38, Dec. 17, 2015 | Wudaokou Shopping Mall |
| 9:56, Dec. 17, 2015 | Gate 6, Zhongguancun Software Park |
| 18:11, Dec. 18, 2015 | Building 1, Jinguyuan |
| 22:30, Dec. 18, 2015 | Beijing Capital International Airport |
| 8:41, Dec. 18, 2015 | Gate 6, Zhongguancun Software Park |

Assuming that the current time point is 10:00, the device 500A may respectively determine a probability that the user goes to the Gate 6 of Zhongguancun Software Park, the Building 1 of Jinguyuan, Zhichun Road, Wudaokou Shopping Mall, and Beijing Capital International Airport at 10:00 based on the historical departure times and the corresponding historical destinations in Table 1.

In 603, the device 500A may determine one or more recommended destinations corresponding to the current time point based on the probabilities corresponding to the plurality of historical destinations. For brevity, the recommended destination(s) corresponding to the current time point may be also referred to as the recommended destination(s).

In some embodiments, after the probability that the user goes to each historical destination is determined, the device 500A may determine the recommended destination(s) corresponding to the current time point based on the probabilities. Further, the device 500A may transmit the recommended destination(s) to the user. For example, the recommended destination(s) may be displayed in an application for car hailing.

In some embodiments, the device 500A may designate a historical destination with corresponding probability greater than a preset threshold as a recommended destination. Alternatively, the device 500A may determine a historical destination with a largest probability as a recommended destination corresponding to the current time point.

For example, the device 500A may obtain the following historical travel information in table 2 by removing the dates and digitizing the time information in Table 1.

TABLE 2

| Destination | Historical Departure Times |
| --- | --- |
| Gate 6, Zhongguancun Software Park | 8.7, 9.7, 9.9, 9.9, 9.9, 10, 10.1, 10.1, 16 |
| Building 1, Jinguyuan | 18, 18.2, 18.9, 19, 19.3, 20.5, 21.1 |
| Zhichuan Road | 19 |
| Wudaokou Shopping Mall | 18.6 |
| Beijing Capital International Airport | 22.5 |

Assuming that the current time point is 9 a.m., the device 500A may determine the probability that the user goes to each of the historical destinations in Table 2 at the current time point as follows:

$P(X=\text{Gate 6, Zhongguancun Software Park}|T=9)$
$=0.88125;$ $-P(X=\text{Building 1, Jinguyuanz}|T=9)=0.115625;$ $P(X=\text{Zhichun Road}|T=9)=0.00625;$ $P(X=\text{Wudaokou Shopping Mall}|T=9)=0.00625;$ $P(X=\text{Beijing Capital International Airport}|$
$T=9)=0.003125$ where X refers to a historical destination, T refers to a current time point, and P(X|T) refers to a probability that the user goes to the historical destination (X) at the current time point (T). Details regarding the determination of the probabilities may be found elsewhere in the present disclosure (e.g., FIG. 8 and the relevant descriptions thereof).

If the preset threshold is 0.88, the device 500A may designate a historical destination with a probability larger than 0.88 as one of the recommended destination(s) corresponding to the current time point. In such case, the Gate 6 of Zhongguancun Software Park may be designated as a recommended destination corresponding to the current time point. Alternatively, the device 500A may designate a historical destination with the largest probability as a recommended destination corresponding to the current time point. In such case, the Gate 6 of Zhongguancun Software Park may be designated as a recommended destination corresponding to the current time point. It should be noted that the above mentioned examples are for illustration purpose and the present disclosure is not intended to be limiting. The device 500A may select the recommended destination(s) from the historical destinations based on the probabilities according to any selection criterion. For example, the device 500A may designate historical destination(s) with top N probabilities as the recommended destination(s). N may have any positive value, such as 1, 2, 10%, 20%, or the like.

The present disclosure provides a process for determining one or more recommended destinations. The device 500A may obtain historical travel information related to a user. The historical travel information may include a plurality of historical departure times and a corresponding historical destination of each historical departure time. For each of the historical destinations, the device 500A may determine a probability that the user goes to the historical destination at a current time point based on the corresponding historical departure time(s). Further, the device 500A may determine one or more recommended destinations based on the probabilities corresponding to the historical destinations. As such, the user is instantly provided with one or more recommended destinations without manually input once an LBS request is received from the mobile device of the user. Thereby the efficiency of car hailing and the user experience may be improved.

It should be noted that the above description of the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the device 500A may determine the recommended destination(s) based on one or more other types of historical behavior information, such as the historical location information, the search history, the browse history of the user by implementing a similar process of the process 400. Take the historical location information as an example, the historical location information may include a plurality of historical locations that the user has been to and a time point when the user went to each of the historical locations. The device 500A may determine a probability that the user goes to each of the historical locations based on the historical location information, and further determine the recommended destination(s) based on the probabilities.

Figure 7:
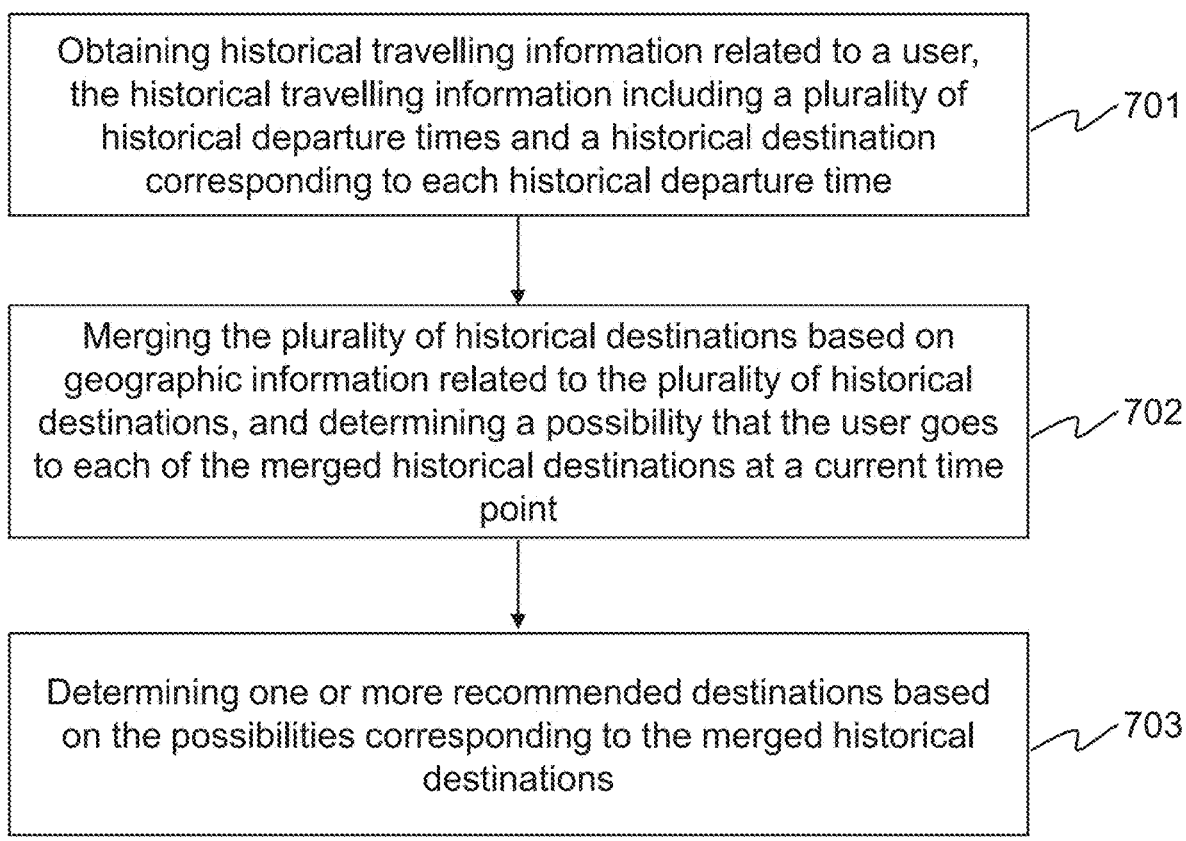
FIG. 7 is a flowchart illustrating an exemplary process for determining one or more recommended destinations based on merged historical destinations according to some embodiments of the present disclosure.

FIG. 7 is a flowchart illustrating an exemplary process for determining one or more recommended destinations according to some embodiments of the present disclosure. Process 700 may be an embodiment of the process 600 in which the historical destinations are merged before determining the corresponding probabilities. The process 700 may be implemented in the LBS system 100 illustrated in FIG. 1. For example, process 700 may be stored in a storage medium (e.g., the storage device 150, the ROM 230, the RAM 240, the storage 390) as a form of instructions, and invoked and/or executed by the server 110 (e.g., the processing engine 112 of the server 110, the processor 220 of the computing device 200), a terminal device (e.g., the requester terminal 130), a device for recommending destinations (e.g., any of the devices 500A to 500E). For illustration purposes, the implementation of the process 700 on the device 500A is described as an example.

In 701, the device 500A may obtain historical travel information related to a user. The historical travel information may include a plurality of historical departure times and a historical destination corresponding to each historical departure time. Operation 701 may be performed in a similar manner with operation 601, and the descriptions thereof are not repeated here.

In 702, the device 500A may merge the historical destinations based on geographic information related to the historical destinations. The device 500A may further determine a probability that the user goes to each of the merged historical destinations at a current time.

A location may have a plurality of descriptions, for example, various place names, which may affect the determination of a probability corresponding to a historical destination. The device 500A may merge the plurality of historical destinations before determining the corresponding probabilities. Specifically, the device 500A may obtain first geographic information of a first historical destination and second geographic information of a second historical destination. Further, the device 500A may merge the first historical destination and the second historical destination as a same historical destination if the distance between them is not greater than a preset threshold. As used herein, the first historical destination and the second historical destination may be two different historical destinations among the plurality of historical destinations. Specifically, the first geographic information may include a first longitude and a first latitude of the first historical destination. The second geographic information may include a second longitude and a second latitude of the second historical destination. The device 500A may merge the first and second historical destinations as the same historical destination if that the distance between the first geographic information and the second geographic information is not greater than the preset threshold. Further, the device 500A may modify the description of the first historical destination according to the description of the second historical destination, or modify the description of the second historical destination according to the description of the first historical destination. Alternatively, the device 500A may rename the first and second historical destinations to a same description.

In some embodiments, the distance between the first geographic information and the second geographic information may be measured by a longitude difference between the first longitude and the second longitude and a latitude difference between the first latitude and the second latitude. The preset threshold may include a preset longitude threshold regarding the longitude difference and a preset latitude threshold regarding the latitude difference. If the longitude difference is smaller than the preset longitude threshold and the latitude difference is smaller than the preset latitude threshold, the device 500 may assume that the distance between the first geographic information and the second geographic information is smaller than the preset threshold. For example, the preset threshold may be (0.00098°, 0.0009°), in which 0.00098° represents the preset longitude threshold and 0.0009° represents the preset latitude threshold. The preset threshold in the present disclosure described above is for illustration purpose and the present disclosure is not intended to be limiting. In addition, the distance between the first geographic information and the second geographic information may be a linear distance or any other predefined distance (e.g., a route distance).

For example, the device 500A may obtain a plurality of historical departure times and a historical destination corresponding to each historical departure time as illustrated in Table 3:

TABLE 3

| 15:54, Nov. 9, 2015 | Community Jiaomen Dongli |
| 14:28, Nov. 8, 2015 | Beijing No. 8 Middle School (Junior Middle School) |
| 16:37, Nov. 4, 2015 | Community Jiaomen Dongli |
| 16:42, Nov. 2, 2015 | Community Jiaomen Dongli |
| 6:27, Nov. 2, 2015 | Beijing No. 8 Junior Middle School |
| 16:34, Nov. 1, 2015 | Beijing No. 8 Junior Middle School |
| 18:19, Oct. 28, 2015 | Community Jiaomen Dongli |
| 17:15, Oct. 27, 2015 | Beijing No. 8 Middle School (Junior Middle School) |
| 19:54, Oct. 26, 2015 | Beijing No. 8 Middle School (Junior Middle School) |
| 19:48, Oct. 26, 2015 | Beijing No. 8 Middle School (Junior Middle School) |
| 17:54, Oct. 26, 2015 | Beijing No. 8 Junior Middle School |
| 15:45, Oct. 25, 2015 | Beijing No. 8 Middle School (Junior Middle School) |
| 17:12, Oct. 18. 2015 | Beijing No. 8 Junior Middle School |
| 19:31, Oct. 11, 2015 | Beijing No. 8 Junior Middle School |
| 20:45, Sep. 24, 2015 | Beijing No. 8 Junior Middle School |
| 18:28, Sep. 24, 2015 | Beijing No. 8 Junior Middle School |
| 20:19, Sep. 24, 2015 | Beijing No. 8 Junior Middle School |
| 20:18, Sep. 24, 2015 | Beijing No. 8 Junior Middle School |
| 19:10, Sep. 24, 2015 | Beijing No. 8 Junior Middle School |
| 18:55, Sep. 24, 2015 | Beijing No. 8 Junior Middle School |

As "Beijing No. 8 Middle School (Junior Middle School)" and "Beijing No. 8 Junior Middle School" should be a same place, the description difference may cause the device 500A to determine a probability corresponding to "Beijing No. 8 Middle School (Junior Middle School)" and a probability corresponding to "Beijing No. 8 Junior Middle School" separately, which may result in an error in probability determination. To solve the problem, the device 500A may obtain geographic information of "Beijing No. 8 Middle School (Junior Middle School)" and geographic information of "Beijing No. 8 Junior Middle School". For example, the geographic information of "Beijing No. 8 Middle School (Junior Middle School)" and "Beijing No. 8 Junior Middle School" may be (Latitude: 39.9001" N, Longitude: 116. 3004" E) and (Latitude: 39.9002" N, Longitude: 116. 3003" E), respectively. Assuming that the preset threshold is (0.00098°, 0.0009°, "Beijing No. 8 Middle School (Junior Middle School)" and "Beijing No. 8 Junior Middle School" may be the same historical destination since the distance between their geographic information is not greater than (0.00098°, 0.0009°). In some embodiments, the device 500A may modify "Beijing No. 8 Middle School (Junior Middle School)" as "Beijing No. 8 Junior Middle School" or modify "Beijing No. 8 Junior Middle School" as "Beijing No. 8 Middle School (Junior Middle School)". Alternatively, the device 500A may rename "Beijing No. 8 Middle School (Junior Middle School)" and "Beijing No. 8 Junior Middle School", for example, as "No. 8 Middle School".

After merging the historical destinations, the device 500A may determine a probability that the user goes to each of the merged historical destinations at a current time point. Therefore, the accuracy of the probability determination may be improved.

In 703, the device 500A may determine one or more recommended destinations based on the probabilities (or probability) corresponding to the merged historical destination(s).

Operation 703 may be performed in a similar manner with operation 603, and the descriptions thereof are not repeated here.

The present disclosure provides a process for determining one or more recommended destinations. The device 500A may obtain historical travel information related to a user. The historical travel information may include a plurality of historical departure times and a corresponding historical destination of each historical departure time. For each of the historical destinations, the device 500A may determine a probability that the user goes to the historical destination at a current time point based on the corresponding historical departure time(s). Further, the device 500A may determine one or more recommended destinations based on the probabilities corresponding to the historical destinations. As such, the user is instantly provided with one or more recommended destinations without manually input once an LBS request is received from the mobile device of the user. Thereby the efficiency of car hailing and the user experience may be improved. In addition, before the probability that the user goes to each historical destination at the current time point is determined, the device 500A may merge the historical destinations based on geographic information related to the historical destinations. Therefore, locations with different descriptions that actually represent a same location may be merged, which may improve the accuracy of the probability determination.

Figure 8:
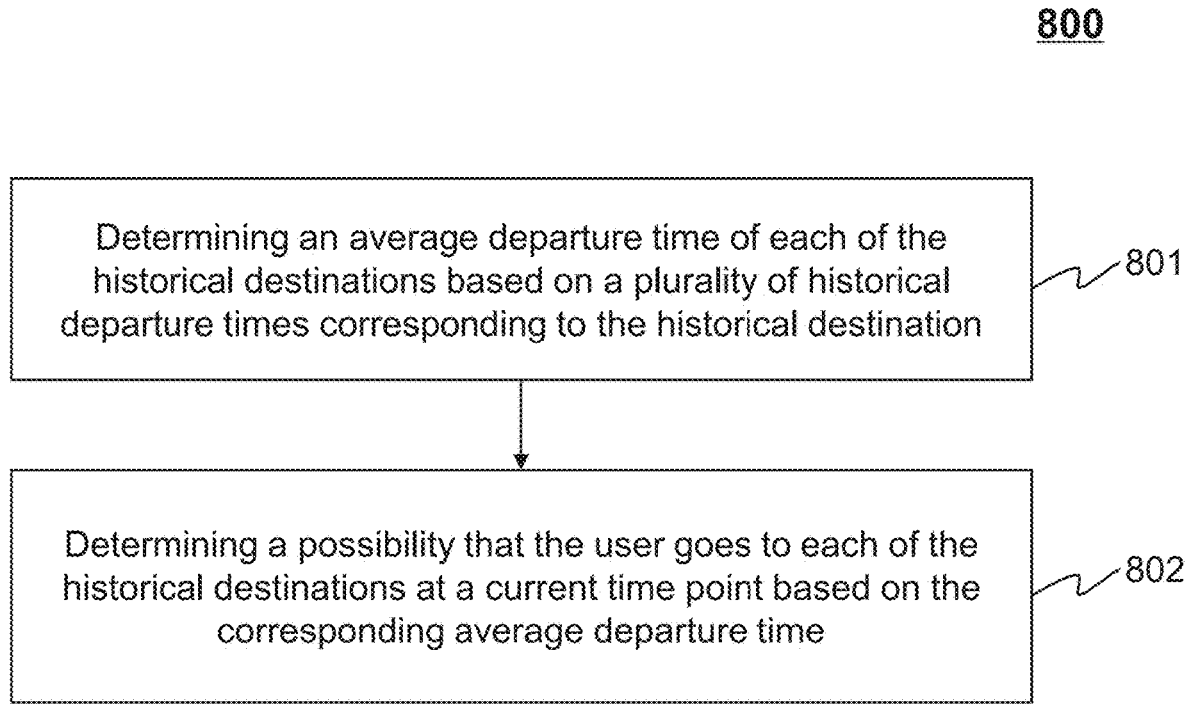
FIG. 8 is a flowchart illustrating an exemplary process for determining a probability that a user goes to a historical destination at a current time point according to some embodiments of the present disclosure.

FIG. 8 is a flowchart illustrating an exemplary process for determining a probability that a user goes to a historical destination at a current time point according to some embodiments of the present disclosure. Process 800 may be performed to achieve operation 602 of the process 600 when a historical destination corresponds to a plurality of historical departure times. In some embodiments, process 800 may be implemented in the LBS system 100 illustrated in FIG. 1. For example, the process 800 may be stored in a storage medium (e.g., the storage device 150, the ROM 230, the RAM 240, the storage 390) as a form of instructions, and invoked and/or executed by the server 110 (e.g., the processing engine 112 of the server 110, the processor 220 of the computing device 200), a terminal device (e.g., the requester terminal 130), a device for recommending destinations (e.g., any of the devices 500A to 500E). For illustration purposes, the implementation of the process 800 on the device 500A is described as an example.

In 801, for each historical destination corresponding to a plurality of historical departure times, the device 500A may determine an average departure time that the user went to the historical destination based on the corresponding historical departure times.

In some embodiments, a historical destination in the historical travel information obtained by the device 500A may correspond to a plurality of historical departure times. For example, a user went to Zhongguancun Software Park at 10:05 on Dec. 10, 2015 and 15: 58 on Dec. 10, 2015. In this case, the device 500A may need to determine an average departure time for the historical destination that corresponds to a plurality of historical departure times. In some embodiments, the device 500A may determine the average departure time by the following two means.

In some embodiments, the device 500A may determine the average departure time based on a first means described as follows.

For each historical destination, the device 500A may transform each corresponding historical departure time into a time vector. The time vector may represent a historical time point in a vector form. Then, the device 500A may sum the time vectors corresponding to the historical destination, and determine the corresponding average departure time accordingly.

Figure 9A:
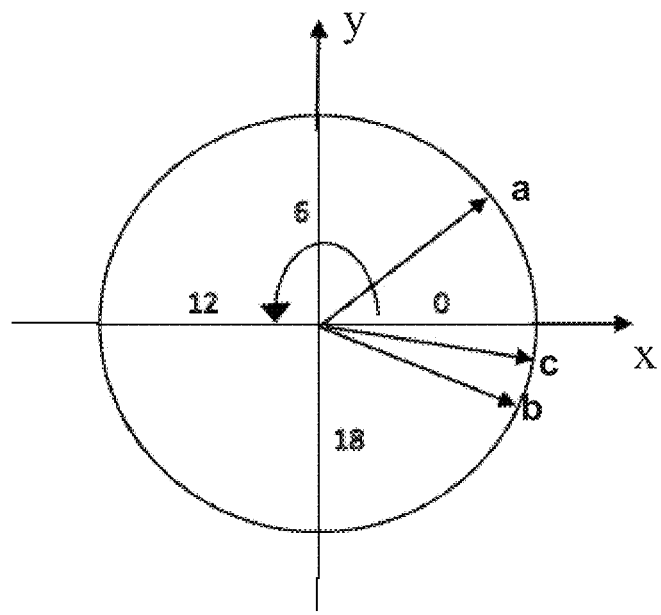
FIG. 9A is a schematic diagram illustrating exemplary time vectors of historical departure times 3:00, 22:00, and 23:00 according to some embodiments of the present disclosure.
Figure 9B:
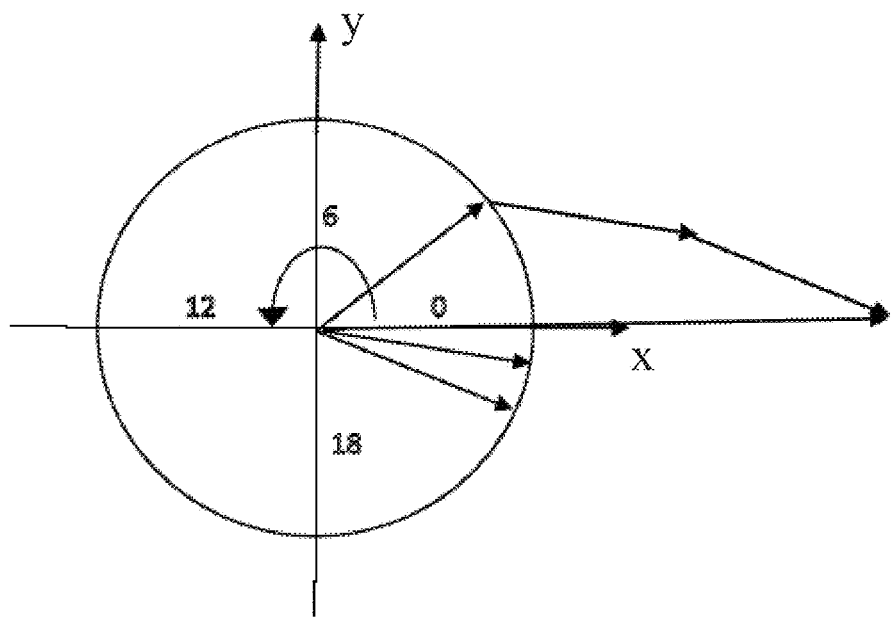
FIG. 9B is a schematic diagram illustrating an exemplary summed time vector of a historical departure times 3:00, 22:00, and 23:00 according to some embodiments of the present disclosure.

Specifically, the device 500A may depict the plurality of historical departure times on a coordinate axis and transform the historical departure times into corresponding time vectors. The present disclose takes the transformation of the historical departure times 3:00, 22:00, and 23:00 as examples. FIG. 9A is a schematic diagram illustrating exemplary time vectors of the historical departure times 3:00, 22:00, and 23:00. FIG. 9B is a schematic diagram illustrating an exemplary summed time vector of the historical departure times 3:00, 22:00, and 23:00 according to some embodiments of the present disclosure. As shown in FIG. 9A, the circle represents a clock, and the two coordinate axes respectively represent an x axis and a y axis. A positive direction of the x axis represents 00:00, and a negative direction of the x axis represents 12:00. A positive direction of the y axis represents 06:00, and a negative direction of the y axis represents 18:00. The three vectors a, b, and c may respectively represent historical departure times 3:00, 22:00, and 23:00. The circular arc arrow represents a moving direction of the clock over time. As shown in FIG. 9B, the three vectors are summed up, and the sum vector may be designated as the corresponding average departure time. For example, the average departure time of 3:00, 22:00, and 23:00 is 0:00 if the sum vector is consistent with 0:00 on the clock (i.e., the positive direction of the x axis).

Further, the device 500A may sum the time vectors to determine the average departure time. The device 500A may determine an angle $\theta_i$ between an $i^{th}$ historical departure time $x_i$ and 12:00 (i.e., the negative direction of the x-axis) according to Equation (1) as below:

$$\theta_i = 2\pi \times \frac{x_i}{24} \tag{1}$$

After $\theta_i$ of each historical departure time is determined, the device 500A may determine the sum vector of n historical departure times according to Equation (2) as below:

$$S=(\Sigma_{i=1}^{N} \cos \theta_i, \Sigma_{i=1}^{n} \sin \theta_i) \tag{2}$$

where $(\cos \theta_i, \sin \theta_i)$ refers to a time vector of the $i^{th}$ historical departure time $x_i$, and S refers to the sum vector.

Then, the device 500A may determine an angle $\theta_t$ between the sum vector and the x-axis (e.g., the positive direction of the x-axis) according to Equation (3) as below:

$$\theta_t = \cos^{-1} \frac{\sum_{i=1}^{n} \cos\theta_i}{\sqrt{\left(\sum_{i=1}^{n} \cos\theta_i\right)^2 + \left(\sum_{i=1}^{n} \sin\theta_i\right)^2}} \tag{3}$$

In the end, the device 500A may transform $\theta_t$ into a corresponding time point X (i.e., the average departure time) according to Equation (4) as below:

$$X = 2\pi \times \frac{\theta_t}{24} \tag{4}$$

According to the above Equations (1) to (4), the device 500A may determine the average departure time corresponding to each of the plurality of the historical destinations.

In some embodiments, the device 500A may determine the average departure time based on a second means described as follows. The device 500A may determine an average departure time corresponding to a historical destination according to Equation (5) as below:

$$\min \Sigma_{i=1}^{n}(X_i-\overline{X}) \quad (5)$$

where n represents a total number of historical departure times corresponding to the historical destination, $X_i$ represents the $i^{th}$ historical departure time, and $\overline{X}$ represents the average departure time of the n historical departure times.

The accuracy of the average departure time determined by the first means may relatively lower than that of the second means. For example, an average departure time of 00:00, 00:00, and 3:00 should be 1:00. However, the corresponding average departure time determined by the first means may be 00:58. The first means may be used to determine an approximate value of the average departure time, but may not be applied to determine the average departure time if a high accuracy is required.

In some embodiments, to generate a more accurate determination result, the device 500A may adopt an arithmetic mean value-based method. According to the measurement error theory, a measurement average (e.g., the arithmetic mean value of the historical departure times) may be a point (or a value) whose sum of squares of distances to all the observed values (e.g., the historical departure times) is smallest. Therefore, the arithmetic mean value of the historical departure times (i.e., the average departure time) may be a solution of the unconstrained optimization problem illustrated in Equation (5).

By solving the unconstrained optimization problem in Equation (5), the device 500A may obtain an equation to determine the arithmetic mean value. For those skilled in the art, it should be understood that the solving process of Equation (5) may be described as follows:

Assuming that:

$$L(\overline{X})=\Sigma_{i=1}^{n}(X_i-\overline{X}) \quad (6)$$

where $L(\overline{X})$ refers to n times of the variance of historical departure times $X_1, X_2, \ldots X_n$.

The device 500A may determine Equation (7) as below by taking the derivate of Equation (6):

$$L(\overline{X})' = \frac{dL}{d\overline{X}} = \sum_{i=1}^{n} 2(X_i - \overline{X}) = 2n X_i - 2\sum_{i=1}^{n} X_i \quad (7)$$

Assuming that $L(\overline{X})=0$, the device 500A may obtain Equation (8) as below:

$$\overline{X} = \frac{\sum_{i=1}^{n} X_i}{n} \quad (8)$$

The average departure time may be a time point whose sum of squares of distances to all the historical departure times is the smallest. In other words, the average departure time may be a solution of the constrained quadratic optimization problem in Equation (9) as below:

$$\begin{cases} \min \sum_{i=1}^{n} [\text{distance}(X_i, \overline{X})]^2 \\ X_i \in [0, 24) \\ \overline{X} \in [0, 24) \end{cases} \quad (9)$$

Then, a process for determining distance($T_1, T_2$) between two historical departure times may be described below. $T_1$ and $T_2$ represent two different historical departure times.

At first, the distance between the two historical departure times cannot be a negative value, i.e., distance($T_1, T_2$)≥0 Secondly, the distance between the two historical departure times cannot exceed 12, i.e., distance($T_1, T_2$)≤12. Therefore, the distance function of two historical departure times may be represented by a piecewise function according to Equation (10) as below:

$$\text{distance}(T_1, T_2) = \begin{cases} |T_1 - T_2|, \text{ if } |T_1 - T_2| \le 12 \\ 24 - |T_1 - T_2|, \text{ if } |T_1 - T_2| > 12 \end{cases} \quad (10)$$

Assuming that:

$$\text{distance}(T_1, T_2) = c * ||T_1 - T_2| + a| + b \quad (11)$$

where c, a, and b refers to constant values to be solved.

The device 500A may determine Equation (12) as below based on Equations (10) and (11):

$$\text{distance}(T_1, T_2) = \begin{cases} -c * (|T_1 - T_2| + a) + b, \text{ if } |T_1 - T_2| \le -a \\ c * (|T_1 - T_2| + a) + b, \text{ if } |T_1 - T_2| > -a \end{cases} \quad (12)$$

The device 500A may determine Equation (13) as below based on Equations (10) and (12):

$$\begin{cases} a = -12 \\ -c * (|T_1 - T_2| + a) + b = |T_1 - T_2| \\ c * (|T_1 - T_2| + a) + b = 24 - |T_1 - T_2| \end{cases} \quad (13)$$

The device 500A may obtain the following results by solving Equation (13):

$$\begin{cases} a = -12 \\ b = 12 \\ c = -1 \end{cases}$$

The device 500A may obtain Equation (14) as below by substituting the above results into Equation (11):

$$\text{distance}(T_1, T_2) = -||T_1 - T_2| - 12| + 12 \quad (14)$$

The device 500A may obtain Equation (15) as below based on the above results from Equations (14), and (9):

$$\begin{cases} \min \sum_{i=1}^{n} (-||X_i - \overline{X}| - 12| + 12)^2 \\ X_i \in [0, 24) \\ \overline{X} \in [0, 24) \end{cases} \quad (15)$$

The device 500A may obtain Equation (16) as below based on Equations (6)-(8) and (15):

$$L(\overline{X}) = \Sigma_{i=1}^{n}(-||X_i - \overline{X}| - 12| + 12)^2 = \Sigma_{i=1}^{n}(||\overline{X} - X_i| - 12| - 12)^2 \quad (16)$$

The device 500A may obtain Equation (17) as below by taking the derivate of Equation (16):

$$L(\overline{X}) = \frac{dL}{d\overline{X}}$$

$$= \sum_{i=1}^{n} 2(||\overline{X}-X_i|-12|-12)*(||\overline{X}-X_i|-12|-12)$$

$$= \sum_{i=1}^{n} 2(||\overline{X}-X_i|-12|-12)*\frac{|\overline{X}-X_i|-12}{||\overline{X}-X_i|-12|}*(|\overline{X}-X_i|-12)$$

$$= \sum_{i=1}^{n} 2(||\overline{X}-X_i|-12|-12)*\frac{|\overline{X}-X_i|-12}{||\overline{X}-X_i|-12|}*\frac{\overline{X}-X_i}{|\overline{X}-X_i|} \quad (17)$$

Assuming that $L(\overline{X})=0$, the device 500A may obtain Equation (18) as below:

$$\sum_{i=1}^{n} (||\overline{X}-X_i|-12|-12)*\frac{|\overline{X}-X_i|-12}{||\overline{X}-X_i|-12|}*\frac{\overline{X}-X_i}{|\overline{X}-X_i|} = 0 \quad (18)$$

Then, the device 500A may obtain $\overline{X}$ by solving Equation (18) according to a process as follows.

For each $X_i$, the device 500A may solve two absolute value equations $|\overline{X}-X_i|=0$ and $||\overline{X}-X_i|-12|=0$, and get $\overline{X}=X_i$ and $\overline{X}=X_i\pm 12$. Therefore, the device 500A may obtain three points associated with $X_i$, that is, $(X_i-12)$, $X_i$, and $(X_i+12)$.

Then, the device 500A may rank a set of solutions of all of the absolute value equations of $X_i$, i.e., $\{X_i-12, X_i, X_i+12|i=1, 2, \ldots, n\}$. The device 500A may filter out one or more solutions which are smaller than 0, larger than 24, or equal to 24. In some embodiments, only one of $X_i$, $(X_i-12)$, and $(X_i+12)$ may be smaller than 0, larger than 24, or equal to 24. Therefore, the set of solutions may actually include 2n elements, which can be denoted as an ordered sequence $(a_1, a_2, \ldots, a_{2n})$.

The 2n elements $(a_1, a_2, \ldots, a_{2n})$ may divide the number axis into $(2n+1)$ sections. For each section of the $(2n+1)$ sections, the device 500A may assume that $\overline{X}$ (i.e., the average departure time) is within the section to determine the absolute values.

The device 500A may verify whether the solution(s) corresponding to the section indeed is within the section. If the solution(s) is not within the section, the solutions(s) may be regarded as unreasonable solutions and be filtered out by the device 500.

According to the above operations, the device 500A may obtain $\overline{X}$, i.e., the average departure time.

The algorithmic process of the operations for solving Equation (18) may be described as follows.

At first, the device 500A may generate the ordered sequence $(a_1, a_2, \ldots, a_{2n})$, For each $X_i$, the device 500A may generate three solutions $\{X_i-12, X_i, X_i+12\}$. Then, the device 500A may filter out the solution(s) that are smaller than 0 or larger than 24. Further, the device 500A may remove duplication of the filtered solutions and rank the remaining solution(s). Theoretically, the number of the remaining solution(s) may be smaller than or equal to 2n. The device 500A may add 0 and 24 into the ordered sequence $(a_1, a_2, \ldots, a_{2n})$ to generate an ordered sequence $(0, a_1, a_2, \ldots, a_{2n}, 24)$. The ordered sequence $(0, a_1, a_2, \ldots, a_{2n}, 24)$ may divide the number axis into $(2n+1)$ sections: $(0, a_1), (a_1, a_2), (a_2, a_3), \ldots, (a_{2n-1}, a_{2n}), (a_{2n}, 24)$. For a section $(a_i, a_{i+1})$, the minimum value, the maximum value, and the middle value may be $a_i$, $a_{i+1}$ and $\frac{1}{2}(a_i+a_{i+1})$, respectively. The device 500A may represent the section $(a_i, a_{i+1})$ as a struct section {float min, float mid, float max}. The device 500A may represent all of the sections by an array of section [ ].

Further, the device 500A may perform a segment traversing operation.

For each section $S_i\{\text{min, mid, max}\}$ in the array of section [ ], the device 500A may determine a solution of the Equation (18). After an absolute value of the Equation (18) is determined, the Equation (18) may be transformed to a linear Equation with one variable. The device 500A may write the linear Equation in the form of $a*\overline{X}+b=0$, and a solution of $\overline{X}$ may be determined (i.e., $\overline{X}=-b/a$). The device 500A may determine the absolute value, a and b based on the range of the section.

According to the above equations and algorithmic processes, the device 500A may determine the average departure time of each of the plurality of historical destinations.

In 802, the device 500A may determine a probability that the user goes to each of the historical destinations at the current time point based on the corresponding average departure time.

In some embodiments, after the average departure time corresponding to each historical destination is determined, the device 500A may determine the probability that the user goes to each historical destination at the current time point based on the average departure time. Specifically, for each of the historical destinations, the device 500A may determine a standard deviation of the corresponding historical departure times. The device 500A may also determine a distribution function of the historical departure times corresponding to the historical destination based on the standard deviation and the average departure time. The device 500A may then determine the probability that the user goes to the historical destination at the current time point based on the distribution function.

Specifically, for those skilled in the art, it should be understood that the device 500A may determine the probability $P(X_i|T)$ that the user goes to the $i^{th}$ historical destination at the current time point T based on Equation (19) as below:

$$P(X_i|T) = \frac{P(T|X_i)*P(X_i)}{\Sigma[P(T|X_i)*P(X_i)]} \quad (19)$$

where $P(X_i)$ refers a probability that the user goes to the $i^{th}$ historical destination, and $P(T|X_i)$ refers a probability that the time when the user went to the $i^{th}$ historical destination is the current time point. It should be noted that the value of $P(X_i)$ may be equal to the frequency value that the user went to the $i^{th}$ historical destination. The device 500A may determine the value of $P(T|X_i)$ by a process described below.

The device 500A may need to estimate a probability density function $f(t)$ based on the distribution of the historical departure times corresponding to the $i^{th}$ historical destination. The probability density function $f(t)$ describes a probability that the historical departure time corresponding to the $i^{th}$ historical destination is equal or close to a certain value. The device 500A may determine the value of $P(T|X_i)$ according to Equation (20) as below:

$$P(T|X_i) = \int_{T-\Delta t}^{T+\Delta t} f(t)*dt \quad (20)$$

The technique for determining the probability density function ƒ(t) may not be limiting. For example, the device 500A may determine the probability density function ƒ(t) based on a Gaussian distribution. The device 500A may determine the probability density function ƒ(t) by any other technique.

The process of determining ƒ(t) based on the Gaussian distribution may be described below. For each of the historical destinations, the device 500A may determine the standard deviation of the corresponding historical departure times by determining a variance of the historical departure times. The device 500A may determine that the historical departure times follow a normal distribution $N(\mu, \sigma^2)$ based on the corresponding average departure time and the standard deviation of the historical departure times. As used herein, $\mu$ and $\sigma$ may respectively refer to the average departure time and the standard deviation of the historical departure times corresponding to the historical destination.

The device 500A may determine the probability density function of $N(\mu, \sigma^2)$ may be described as Equation (21) below. The device 500A may determine the distribution function F(t) of $N(\mu, \sigma^2)$ according to Equation (22) below:

$$f(t) = \frac{1}{\sqrt{2\pi}\,\sigma} \exp\left(-\frac{(t-\mu)^2}{2\sigma^2}\right) \quad (21)$$

$$F(t) = \frac{1}{\sqrt{2\pi}\,\sigma} \int_{-\infty}^{t} \exp\left(-\frac{(t-\mu)^2}{2\sigma^2}\right) * dt \quad (22)$$

The device 500A may determine the probability $P(T|X_i)$ that the time when the user went to the historical destination $X_i$ is the current time based on the distribution function F(t) of $N(\mu, \sigma^2)$ shown as Equation (22). The probability $P(T|X_i)$ may be determined according to Equation (23) as below:

$$P(T|X_i) = F(T+\Delta t) - F(T-\Delta t) \quad (23)$$

For those skilled in the art, it should be understood that the device 500A may first transform the normal distribution of the historical departure times into a standard normal distribution as illustrated in Equation (24). Then the device 500A may determine the $P(T|X_i)$ illustrated in Equation (26) according to Equations (24) and (25):

$$T \sim N(u, \sigma^2) \Rightarrow \frac{T-\mu}{\sigma} \sim N(0, 1) \quad (24)$$

$$F(T) = \phi\left(\frac{T-\mu}{\sigma}\right) \quad (25)$$

$$P(T \mid X_i) = \phi\left(\frac{T+\Delta t-\mu}{\sigma}\right) - \phi\left(\frac{T-\Delta t-\mu}{\sigma}\right) \quad (26)$$

After the value of $P(T|X_i)$ is determined, the device 500A may determine the probability $P(X_i|T)$ that the user goes to the $i^{th}$ historical destination at the current time point T according to Equation (19).

For example, for those skilled in the art, it should be understood that the frequency value (denoted as f), the average departure time (denoted as e) and the standard deviation (denoted as d) of each of historical departure times corresponding to each historical destination in Table 2 may be shown in Table 4:

TABLE 4

| Destination | Historical Departure Times | Distribution Indexes |
|---|---|---|
| Gate 6, Zhongguancun Software Park | 8.7, 9.7, 9.9, 9.9, 9.9, 10, 10.1, 10.1, 16 | e = 10.5, d = 2, f = 0.47 |
| Building 1, Jinguyuan | 18, 18.2, 18.9, 19, 19.3, 20.5, 21.1 | e = 19.3, d = 0.96, f = 0.37 |
| Zhichuan Road | 19, 20 | e = 19.5, d = 0.25, f = 0.05 |
| Wudaokou Shopping Mall | 18, 20 | e = 19, d = 0.33, f = 0.05 |
| Beijing Capital International Airport | 22, 23 | e = 19.5, d = 0.25, f = 0.05 |

Assuming that the current time point is 09:00, the device 500A may determine the probabilities corresponding to the historical destinations according to the above determination process of the probabilities as follows:

$P(T=9|X=\text{Gate 6, Zhongguancun Software Park})= 0.3$, $P(X=\text{Gate 6, Zhongguancun Software Park})=0.47$ $P(T=9|X=\text{Building 1, Jinguyuan})=0.05$, $P(X=\text{Building 1, Jinguyuan})=0.37$ $P(T=9|X=\text{Zhichun Road})=0.02$, $P(X=\text{Zhichun Road})=0.05$ $P(T=9|X=\text{Wudaokou Shopping Mall})=0.02$, $P(X=\text{Wudaokou Shopping Mall})=0.05$ $P(T=9|X=\text{Beijing Capital International Airport})=0.01$, $P(X=\text{Beijing Capital International Airport})=0.05$.

In this case, the device 500A may determine the probability that the user goes to each of the historical destinations at the current time point T as follows:

$P(X=\text{Gate 6, Zhongguancun Software Park}|T=9)=0.88125$;

$P(X=\text{Building 1, Jinguyuan}|T=9)=0.115625$;

$P(X=\text{Zhichun Road}|T=9)=0.00625$;

$P(X=\text{Wudaokou Shopping Mall}|T=9)=0.00625$;

$P(X=\text{Beijing Capital International Airport}|T=9)=0.003125$.

It should be noted that, in the determination of the probabilities that the user goes to the historical destinations at the current point, the user may have being to some of the historical destinations more frequently than other historical destination(s), which may cause an error in the determination of the deviation a of the normal distribution function fitted to the historical departure times of a historical destination. For example, the deviation a corresponding to a historical destination may be relatively small if the user rarely goes to a historical destination (e.g., only goes to the historical destination once). To solve this problem, in some embodiments, the device 500A may apply a penalty coefficient into the original standard deviation a corresponding to the historical destination. For example, the standard deviation including the penalty coefficient may be equal to $$\left(\sigma + \min\left(1, \max\left(0.2, \frac{1}{\log_{10}(c)}\right)\right)\right).$$

As used herein, c represents the number of times that the user went to the historical destination. Therefore, the accuracy of determining the probabilities may be improved.

In addition, during the determination of the probability, a value range of historical departure times corresponding to a historical destination in the normal distribution may be $(-\infty, +\infty)$. However, a probability that the historical departure times are within a value range of $(-3\sigma, +3\sigma)$ may reach 0.999. To solve this problem, the device 500A may set a minimum value of 0.00001 for a probability that the historical departure times are not within the range of $(-3\sigma, +3\sigma)$, and the accuracy of the determined probability corresponding to each historical destination may be improved.

The present disclosure provides a process for determining one or more recommended destinations. The device 500A may obtain historical travel information related to a user. The historical travel information may include a plurality of historical departure times and a corresponding historical destination of each historical departure time. For each of the historical destinations, the device 500A may determine a probability that the user goes to the historical destination at a current time point based on corresponding historical departure time(s). Further, the device 500A may determine one or more recommended destinations based on the probabilities corresponding to the plurality of historical destinations. As such, the user is instantly provided with one or more recommended destinations without manually input once an LBS request is received from the mobile device of the user. Thereby the efficiency of car hailing and the user experience may be improved. In addition, for each of the historical destinations, the device 500A may determine a distribution function of the corresponding historical departure times based on an average departure time and the standard deviation of the historical departure times. Further, the device 500A may determine the probability that the user goes to the historical destination at the current time point. Therefore, the accuracy of the probability determination may be improved.

Alternatively, in some embodiments, the device 500A may receive an instruction triggered and/or inputted by the user before obtaining the historical travel information related to the user. The instruction may instruct the device 500A to obtain one or more recommended destinations corresponding to the current time point.

Specifically, the user may trigger and/or input the instruction by clicking an application (e.g., an application for hailing a vehicle), single or double touching (or tapping) a screen, or by pressing a button. In some embodiments, the user may trigger and/or input the instruction by any other way, e.g., by a voice input, a text input, a fingerprint, a face, etc. The way of triggering and/or inputting the instruction may be not limiting in the present disclosure. In addition, after receiving the instruction triggered and/or inputted by the user, the device 500A may determine the one or more recommended destinations corresponding to the current time point in response to the instruction.

Figure 10A:
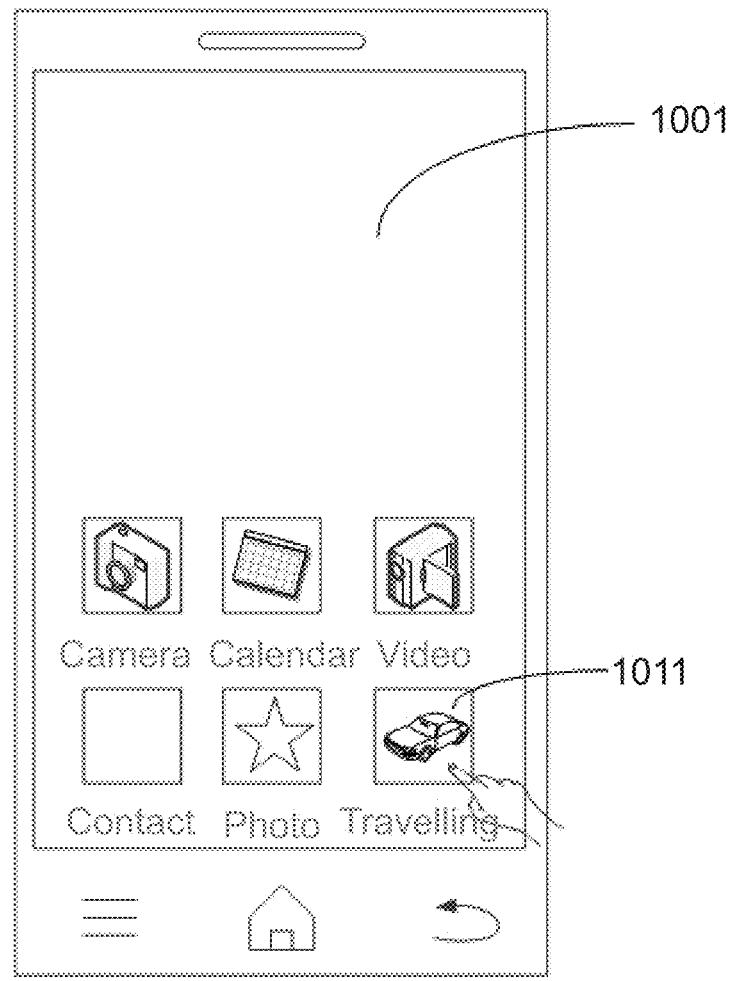
FIGS. 10A and 10B are schematic diagrams illustrating exemplary user interfaces of a terminal device according to some embodiments of the present disclosure.
Figure 10B:
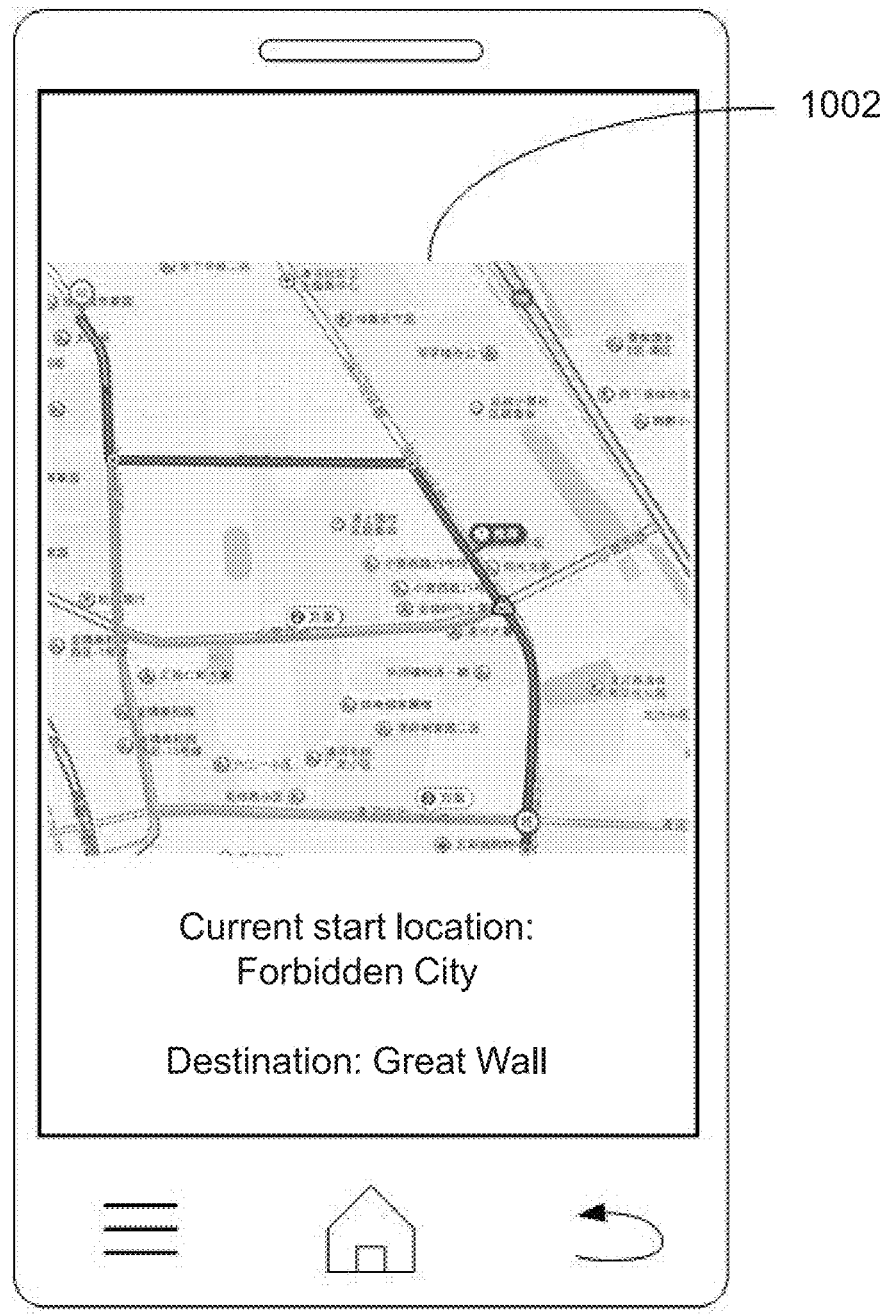

FIGS. 10A and 10B are schematic diagrams respectively illustrating an exemplary user interface 1001 and 1002 of a terminal device according to some embodiments of the present disclosure. The user interface 1001 in FIG. 10A is an interface before the user initiates or inputs an instruction for determining a recommended destination. The interface 1002 in FIG. 10B displays a current location and a destination. As shown in FIG. 10A, a plurality of applications installed on the terminal device are displayed in the user interface 1001. The applications include an application 1011 for car hailing. The user may trigger or input an instruction for determining a recommended destination by touching the application 1011. After receiving the instruction, the terminal device may obtain historical travel information related to the user, and determine one or more recommended destinations corresponding to the current time point based on the historical travel information. As shown in FIG. 10B, after a recommended destination is determined, the terminal device displays the "Forbidden City" as a current location and the "Great Wall" as the recommended destination on the user interface 1002. In this case, the user does not need to manually input a destination or manually select a destination based on historical records, which improves user experience.

It should be noted that the examples in FIGS. 10A and 10B are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the user may input an instruction for recommending destination in any way. As another example, the recommended destination(s) may be determined by any device for recommending destinations other than the terminal device, such as any one of the devices 500A to 500E, the processing engine 112, or the like. The device for recommending destinations may determine one or more recommended destinations for the user in response to the instruction inputted or triggered by the user, and transmit the recommended destination(s) to the terminal device for display.

Figure 11A:
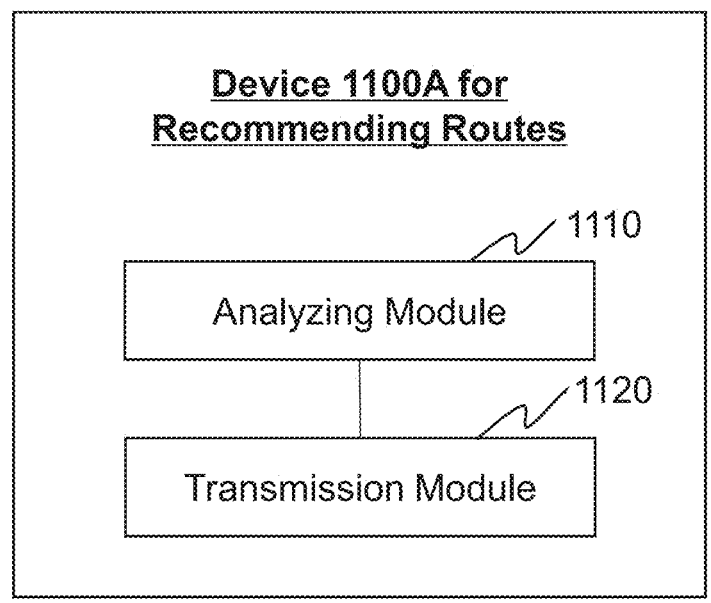
FIGS. 11A-11E are schematic block diagrams illustrating exemplary devices for recommending routes according to some embodiments of the present disclosure.

FIG. 11A is a schematic block diagram illustrating an exemplary device 1100A for recommending routes according to some embodiments of the present disclosure. The device 1100A may include an analyzing module 1110 and a transmission module 1120. The device 1100A may exist independently, or be integrated into a terminal device (e.g., the requester terminal 130) or the server 110 (for example, as a component of the processing engine 112). The device 1100A may be implemented on software and/or hardware.

The analyzing module 1110 may be configured to obtain one or more candidate POIs of a user corresponding to a target time interval that includes a current time point based on historical behavior information related to the user. The analyzing module 1110 may further designate the candidate POI(s) as one or more recommended destinations of the user.

The transmission module 1120 may be configured to determine one or more routes to reach each of the recommended destination(s) for the user. In some embodiments, the transmission module 1120 may transmit the recommended destination(s) to the mobile device (e.g., the requester terminal 130) of the user for display.

In some embodiments, the device 1100A for recommending routes may be an independent device, or be integrated into other devices, such as a smart home device, a wearable device, a smart mobile device (e.g., a smartphone, a computer, a server), a virtual reality device, an augmented reality device, or the like, or any combination thereof.

In some embodiments, upon detecting that a user launches a certain software application (e.g., a car-hailing application) and/or enters an interface of route searching or route navigation, the analyzing module 1110 may determine the recommended route(s) by performing processes for recommending routes described in the present disclosure (e.g., any of the processes 1200 to 1600). For example, the analyzing module 1110 may determine one or more candidate POIs of the user corresponding to a target time interval based on historical behavior information related to the user. The analyzing module 1110 may designate the one or more candidate POIs as one or more recommended destinations of the user. After the recommended destination(s) is determined by the analyzing module 1110, the transmission module 1120 may determine one or more routes to reach each recommended destination for the user, and transmit the route(s) to the mobile device (e.g., the requester terminal 130) of the user for display.

Figure 11B:
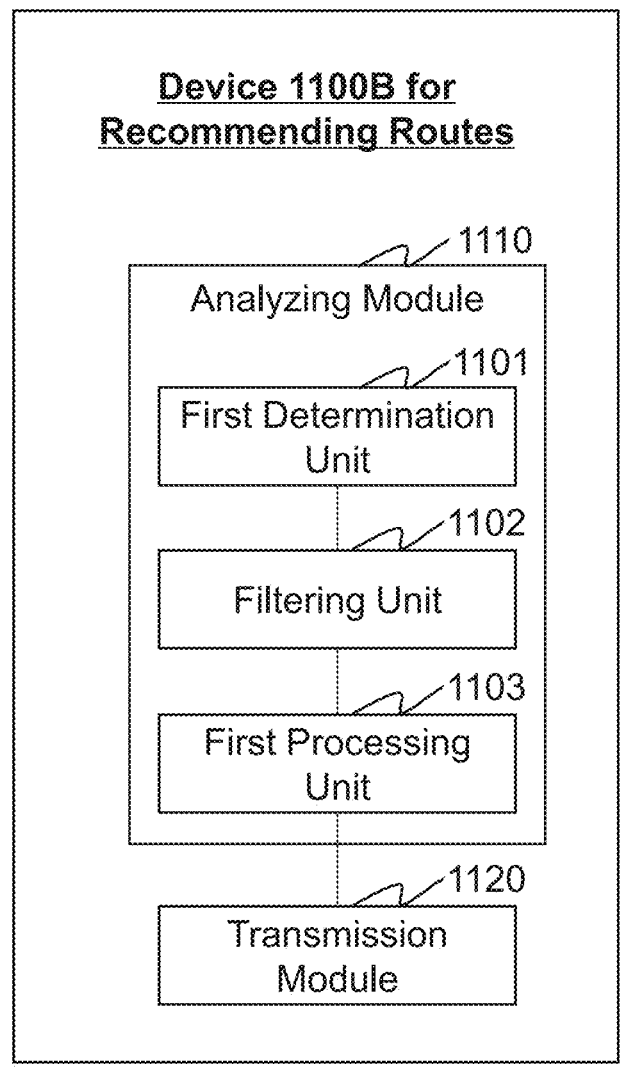

FIG. 11B is a schematic block diagram illustrating an exemplary device 1100B for recommending routes according to some embodiments of the present disclosure. The device 1100B may be an embodiment of the device 1100A in which the analyzing module 1110 may further include a first determination unit 1101, a filtering unit 1102, and a first processing unit 1103.

The first determination unit 1101 may be configured to determine one or more locations searched by a user in each of one or more time intervals based on historical behavior information related to the user.

The filtering unit 1102 may be configured to determine one or more candidate POIs among the location(s) searched by the user. The candidate POI(s) may include one or more location(s) searched by the user in a target time interval that includes a current time point.

The first processing unit 1103 may be configured to determine a times that each of the candidate POI(s) has been searched. The first processing unit 1103 may further designate the candidate POI that is most frequently searched as a recommended destination of the user.

In some embodiments, the first determination unit 1101 may determine one or more locations searched by the user and one or more search times corresponding to the location(s) based on the search history. Further, the filtering unit 1102 may determine location(s) searched by the user in each of one or more time intervals. The filtering unit 1102 may then determine one or more locations searched by the user in the target time interval. The first processing unit 1103 may determine the times that each of the candidate location(s) has been searched, and designate the candidate location that is most frequently searched as a recommended destination of the user.

The device 1100B may determine the destination that the user wants to go to at the current time based on the search history. The device 1100B may then determine the one or more routes to reach the recommended destination, and transmit the route(s) to the mobile device (e.g., the requester terminal 130) of the user quickly and accurately.

Figure 11C:
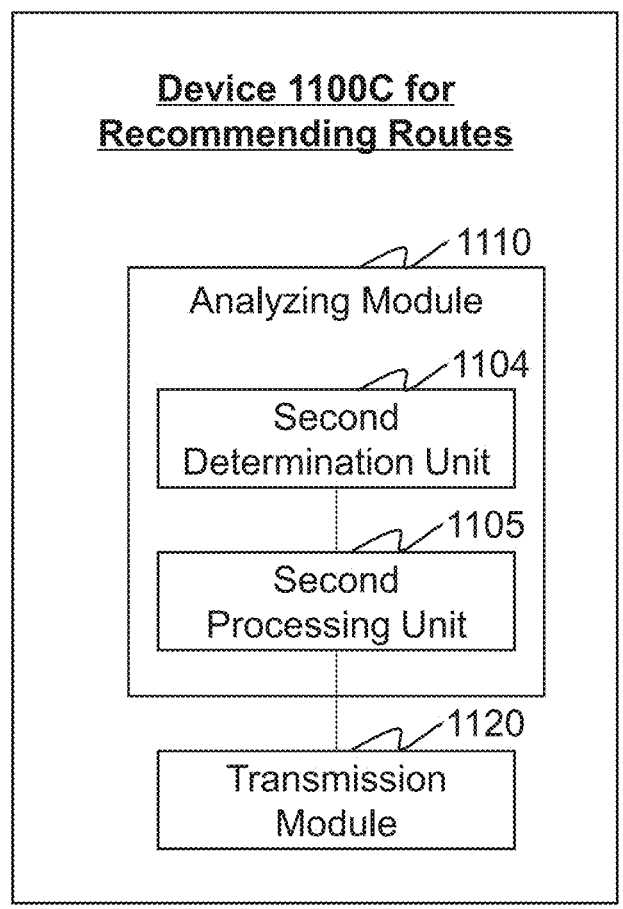

FIG. 11C is a schematic block diagram illustrating an exemplary device 1100C for recommending routes according to some embodiments of the present disclosure. The device 1100C may be an embodiment of the device 1100A in which the analyzing module 1110 further includes a second determination unit 1104 and a second processing unit 1105.

The second determination unit 1104 may be configured to determine a plurality of historical locations that the user has been to in each of one or more time intervals based on historical behavior information related to the user.

For a historical location corresponding to a target time interval that includes the current time point, the second processing unit 1105 may be configured to designate the historical location as a recommended destination of the user if a distance between the current location of the user and the historical location is larger than a distance threshold.

In some embodiments, the second determination unit 1104 may determine one or more historical locations that a user has been to in each of one or more time intervals based on the historical behavior information related to the user. Further, the second processing unit 1105 may filter out one or more historical locations corresponding to a target time interval that includes the current time point (also referred to as candidate POIs for brevity). For each candidate POI, the second processing unit 1105 may determine whether the current location of the user is near the candidate POI. For example, the second processing unit 1105 may determine whether the current location of the user is located within a threshold distance to the candidate POI. If the current location of the user is not within the threshold distance to the candidate POI, the second processing unit 1105 may speculate that the user wants to go to the candidate POI, and designate the candidate POI as a recommended destination. Further, the second processing unit 1105 may determine one or more routes to the recommended destination, and transmit the route(s) to the mobile device (e.g., the requester terminal 130) of the user for display. If the current location of the user is located within the threshold distance to each candidate POI, the second processing unit 1105 may skip the candidate POI(s) and determine one or more recommended destinations by, for example, performing other processes described elsewhere in the present disclosure (e.g., process 1200, process 1300, process 1500).

Figure 11D:
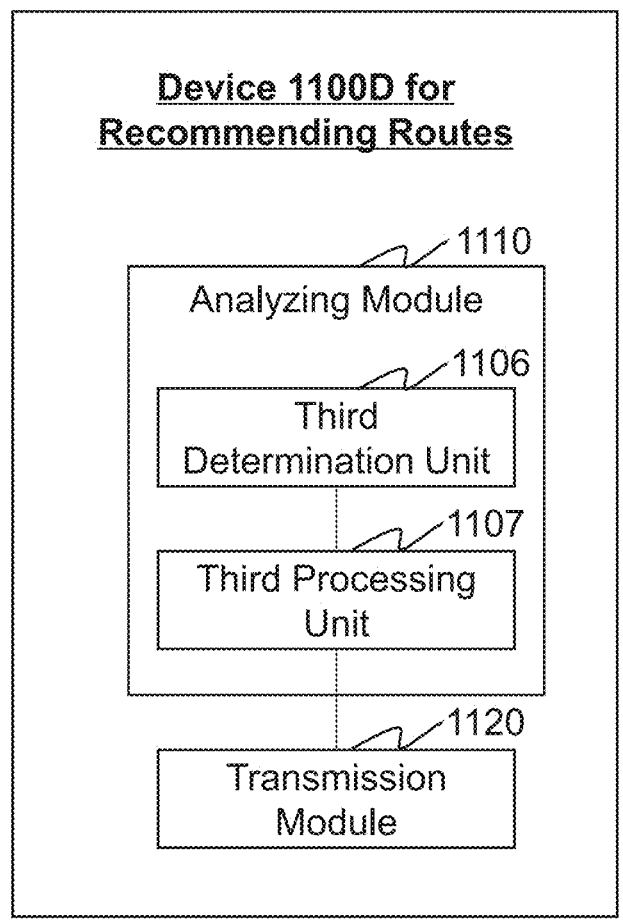

FIG. 11D is a schematic block diagram illustrating an exemplary device 1100D for recommending routes according to some embodiments of the present disclosure. The device 1100D may be an embodiment of the device 1100A in which the analyzing module 1110 further includes a third determination unit 1106 and a third processing unit 1107.

The third determination unit 1106 may be configured to obtain one or more historical service orders initiated by the user in each of one or more time intervals based on historical behavior information related to the user.

The third processing unit 1107 may be configured to designate one or more destinations of the historical service order(s) corresponding to a target time interval that includes a current time point as one or more recommended destinations.

In some embodiments, the third determination unit 1106 may obtain the historical service orders initiated by the user based on historical behavior information. The historical behavior information may include one or more historical service orders initiated by the user, e.g., historical express orders, historical vehicle-hailing orders, etc. The third determination unit 1106 may determine historical service orders initiated by the user in one or more time intervals based on the historical behavior information related to the user. Further, the third processing unit 1107 may select one or more historical service orders corresponding to the target time interval that includes a current time point. The third processing unit 1107 may designate one or more historical destinations of the historical service order(s) corresponding to the target time interval as recommended destination(s) of the user. The transmission module 1120 may determine one or more routes to reach each of the recommended destination(s) for the user, and transmit the route(s) to the mobile device (e.g., the requester terminal 130) of the user for display.

Figure 11E:
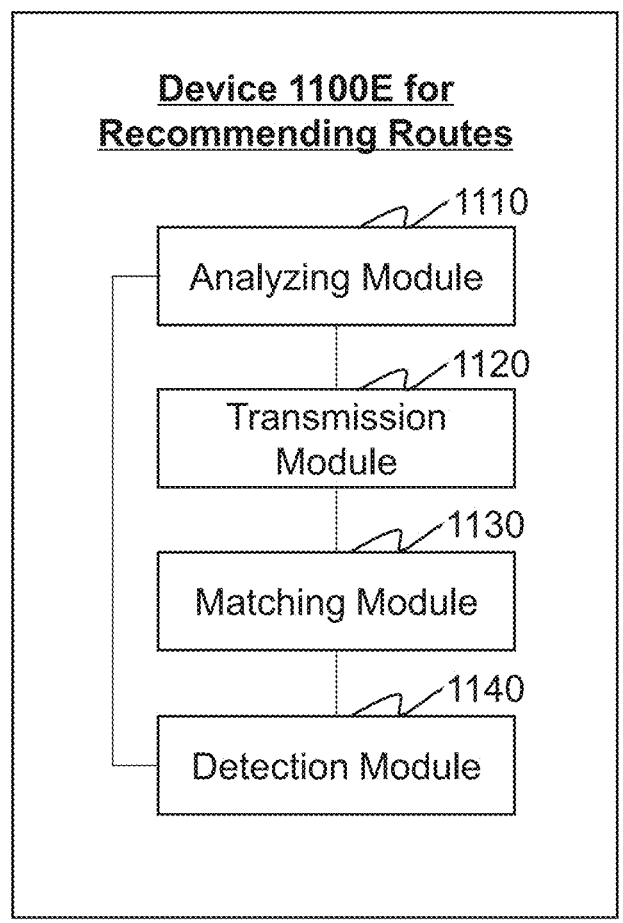

FIG. 11E is a schematic block diagram illustrating an exemplary device 1100E for recommending routes according to some embodiments of the present disclosure. The device 1100E may be an embodiment of the device 1100A and further include a matching module 1130 and a detection module 1140.

The transmission module 1120 may be further configured to recommend one or more bus routes passing through one or more bus stations near a user if historical behavior information related to the user does not include historical behavior information corresponding to a current time point. In some embodiments, a bus station may be regarded as near the user if the distance (e.g., the linear distance, the route distance) between the bus station and the user is equal to or smaller than a threshold (e.g., 200 meters, 500 meters, 1000 meters).

In some embodiments, the transmission module 1120 may recommend one or more public transportation routes passing through another type of public transportation station near the user. The public transportation station may include a subway station, a train station, a rent station of sharing vehicles (e.g., bicycles, motorcycles), or the like, or any combination thereof. For brevity, a public route passing through a public transportation station near the user may be referred to as a public transportation routes near the user (or a terminal device of the user). For illustration purposes, the present disclosure takes the bus station as an example.

In response to a user selection of one of the bus routes, the matching module 1130 may be configured to generate a relationship between a target time interval including the current time point, the current location of the user, and the bus route selected by the user. The matching module 1130 may store the relationship into a set of candidate public routes of the user.

The detection module 1140 may be configured to determine whether the set of candidate public routes includes a candidate public route corresponding to a target time interval including a current time point and a current location of the user. If so, the detection module 1140 may recommend the candidate public route corresponding to the target time interval and the current location to the user.

If all of set of the candidate public routes do not correspond to the target time interval and the current location of the user, the analyzing module 1110 may further determine one or more locations that the user is interested in based on historical behavior information related to the user and the current time point, and designate the one or more locations that the user is interested in as one or more recommended destinations.

It should be noted that the above description regarding the devices 1100A to 1100E is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, any one of the devices 1100A to 1100E may include one or more additional modules (e.g., a storage module). As another example, any module of the devices 1100A to 1100E may be omitted. As yet another example, any two or more modules of a route recommending device (e.g., any one of devices 1100A to 1100E) may be integrated into one module to perform the functions thereof.

Figure 12:
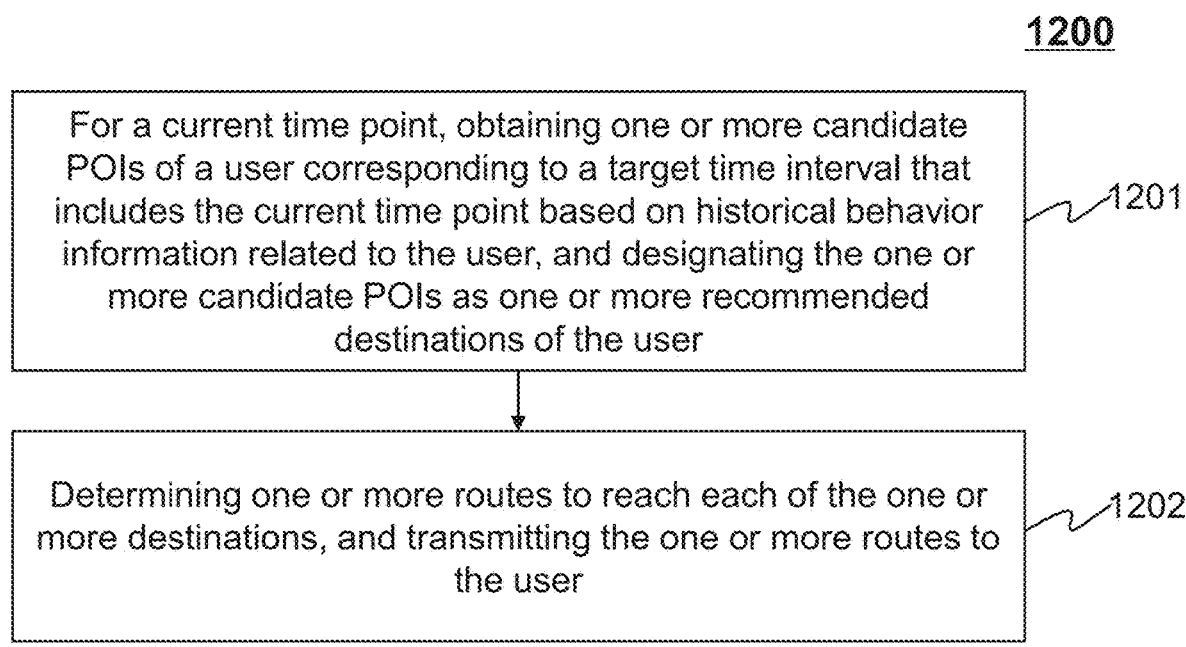
FIG. 12 is a flowchart illustrating an exemplary process for recommending one or more routes for a user according to some embodiments of the present disclosure.

FIG. 12 is a flowchart illustrating an exemplary process for recommending one or more routes for a user according to some embodiments of the present disclosure. In some embodiments, the process 1200 may be performed by any device for recommending routes (e.g., any of the devices 1100A to 1100E). In some embodiments, the process 1200 may be implemented in the LBS system 100 illustrated in FIG. 1. For example, the process 1200 may be stored in a storage medium (e.g., the storage device 150, the ROM 230, the RAM 240, the storage 390) as a form of instructions, and invoked and/or executed by the server 110 (e.g., the processing engine 112 of the server 110, the processor 220 of the computing device 200), a terminal device (e.g., the requester terminal 130), a device for recommending routes (e.g., any of the devices 1100A to 1100E). For illustration purposes, the implementation of the process 1200 on the device 1100A is described as an example.

In 1201, for a current time point, the device 1100A may obtain one or more candidate POIs of a user corresponding to a target time interval that includes the current time point based on historical behavior information related to the user. The device 1100A may further designate the candidate POI(s) as one or more recommended destinations of the user.

As described in FIG. 4B, the POI refers to a location that a user may be interested in or want to go to. The historical behavior information may include historical location information, search history, browsing history, historical service orders (e.g., historical car hailing service orders) of the user, or the like, or any combination thereof. The target time interval may be any time interval that includes the current time point.

In 1202, the device 1100A may determine one or more routes to reach each of the recommended destination(s) for the user. In some embodiments, the device 1100A may transmit the recommended destination(s) to the mobile device (e.g., the requester terminal 130) of the user for display.

In some embodiments, the device 1100A for recommending routes may be an independent device, or be integrated into other devices, such as a smart home device, a wearable device, a smart mobile device (e.g., a smartphone, a computer, a server), a virtual reality device, an augmented reality device, or the like, or any combination thereof.

In some embodiments, upon detecting that a user launches a certain software application (e.g., a car-hailing application) and/or enters an interface of route searching or route navigation, the device 1100A may determine the recommended route(s) by performing processes for recommending routes described in the present disclosure (e.g., any of the processes 1200 to 1600). Specifically, the device 1100A may determine one or more candidate POIs of the user corresponding to a target time interval based on historical behavior information related to the user. The device 1100A may designate the one or more candidate POIs as one or more recommended destinations of the user. After the recommended destination(s) is determined, the device 1100A may determine one or more routes to reach each recommended destination for the user, and transmit the route(s) to the mobile device (e.g., the requester terminal 130) of the user for display.

The device 1100A may determine the recommended destination(s) based on the historical behavior information related to the user and historical user behaviors corresponding to one or more time intervals. Accordingly, one or more destination(s) may be efficiently recommended without a manual input of a destination by the user. Further, the recommended destination(s) are more likely to reflect a location that the user wants to go to at the current time point, which makes it possible to recommend route(s) for the user quickly and accurately. Specifically, the device 1100A may determine the recommended destination(s) based on the historical behaviors of the user by various ways. More detailed description of the determination of the recommended destination(s) based on the historical behaviors (or historical behavior information) of the user can be found elsewhere in the present disclosure (e.g., FIGS. 13 to 15 and the descriptions thereof).

Specifically, the recommended route(s) may include a route that is implemented by any public transportation means. Exemplary public transportation means may include a carpooling vehicle, a taxi, an express car, a public transportation means with predetermined stopping stations (e.g., bus, subway), or the like, or any combination thereof. For example, the recommended route(s) may include but is not limited to a bus route, a subway route, or the like, or any combination thereof. In some embodiments, the recommended route(s) may include a route that is implemented by another transportation means, such as but not limited to a private car, a hitch, a train, a bullet train, a high speed rail, a vessel, an aircraft, a spaceship, a hot-air balloon, a driverless vehicle, a bicycle, a tricycle, a motorcycle, or the like, or any combination thereof.

Figure 13:
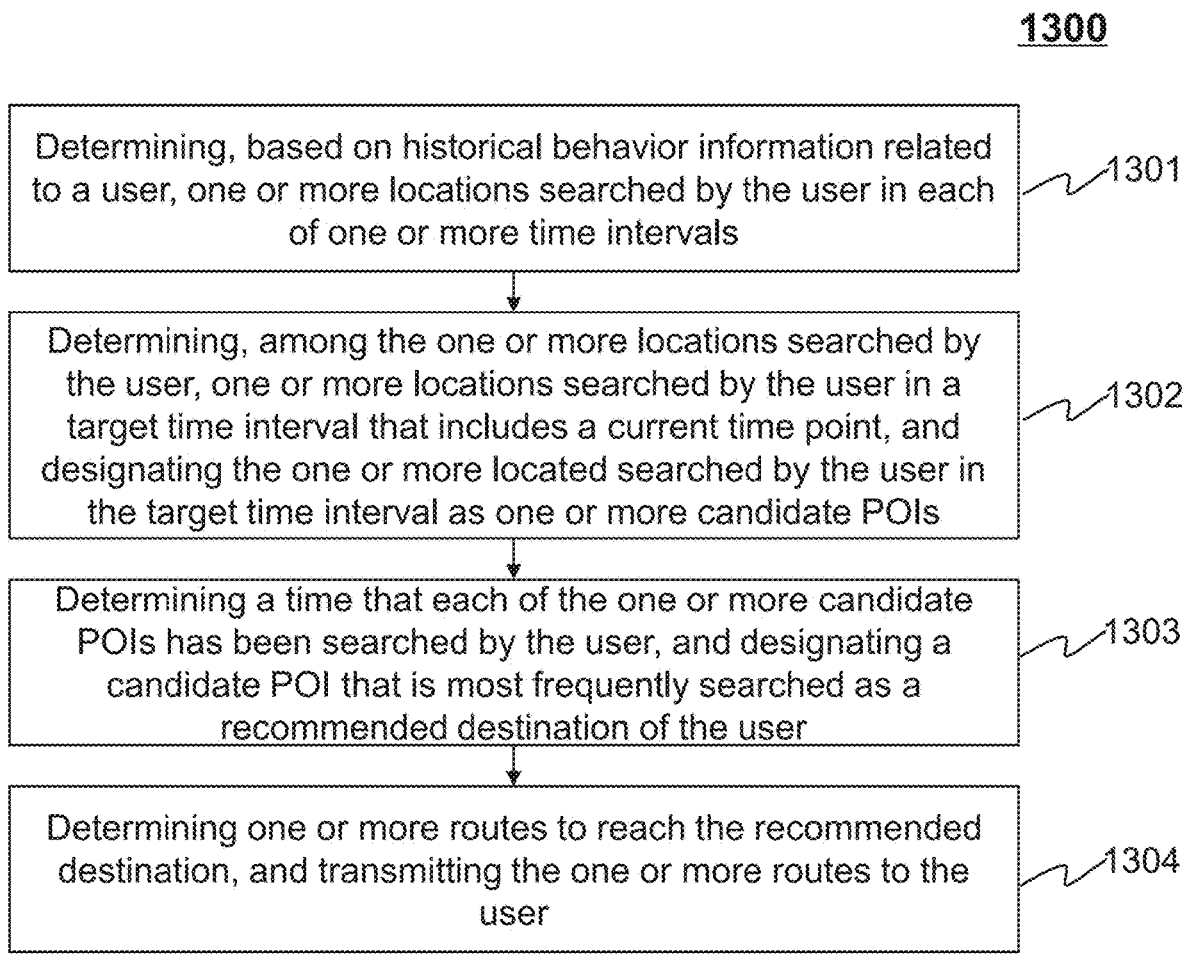
FIG. 13 is a flowchart illustrating an exemplary process for recommending one or more routes for a user according to some embodiments of the present disclosure.

FIG. 13 is a flowchart illustrating an exemplary process for determining one or more recommended routes for a user according to some embodiments of the present disclosure. Process 1300 may be an embodiment of the process 1200 in which the recommended route(s) of the user are determined based on search history of the user. In some embodiments, the process 1300 may be performed by any device for recommending routes (e.g., any of the devices 1100A to 1100E). In some embodiments, the process 1300 may be implemented in the LBS system 100 illustrated in FIG. 1. For example, the process 1300 may be stored in a storage medium (e.g., the storage device 150, the ROM 230, the RAM 240, the storage 390) as a form of instructions, and invoked and/or executed by the server 110 (e.g., the processing engine 112 of the server 110, the processor 220 of the computing device 200), a terminal device (e.g., the requester terminal 130), a device for recommending routes (e.g., any of the devices 1100A to 1100E). For illustration purposes, the implementation of the process 1300 on the device 1100A is described as an example.

In 1301, the device 1100A may determine one or more locations searched by the user in each of one or more time intervals based on historical behavior information related to a user.

In 1302, the device 1100A may determine one or more candidate POIs among the location(s) searched by the user. The candidate POI(s) may include one or more location(s) searched by the user in a target time interval that includes a current time point.

In 1303, the device 1100A may determine a times that each of the candidate POI(s) has been searched. The device 1100A may further designate the candidate POI that is most frequently searched as a recommended destination of the user.

The historical behavior information of the user may include the search history of the user. The search history may include a location searched by the user, a search time when the user searched for the location, times that the location has been searched by the user, or the like, or any combination thereof. The device 1100A may determine one or more locations searched by the user and one or more search times corresponding to the location(s) based on the search history. Further, the device 1100A may determine location(s) searched by the user in each of one or more time intervals. The device 1100A may then determine one or more locations searched by the user in the target time interval. The device 1100A may designate the location(s) searched in the target time interval by the user as one or more candidate locations (or candidate POIs). In some embodiments, the device 1100A may determine the times that each of the candidate location(s) has been searched. A candidate location that has been searched more times may indicate that the use is more interested in the candidate location. Thus, the device 1100A may designate the candidate location as the recommended destination for the user. The device 1100A may further determine one or more routes to reach the recommended destination, and transmit the route(s) to the mobile device (e.g., the requester terminal 130) of the user for display.

For example, the device 1100A may analyze historical behavior information related to the user and find out that the destination usually searched by the user in the time interval of 9:00 a.m. to 10:00 a.m. is his/her workplace (e.g., Xizhimen). Accordingly, if the user launches an application (a car-haling application) on the mobile device and enters a search interface at 9:30 a.m., the device 1100A may speculate that the destination that the user is currently interested in is Xizhimen.

In the process 1300, the device 1100A may determine the destination that the user wants to go to at a current time based on the search history. The device 1100A may then determine the one or more routes to reach the recommended destination, and transmit the route(s) to the mobile device (e.g., the requester terminal 130) of the user quickly and accurately.

It should be noted that the above description regarding the process 1300 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, in 1303, the device 1100A may designate a plurality of candidate POIs with top N times that the POIs have been searched by the user as recommended destinations of the user. N may any positive value, such as 2, 5, 10%, 20%, or the like. The device 1100A may further recommend one or more routes to reach each of the recommended destinations. The recommended routes may be transmitted to the mobile device (e.g., the requester terminal 130) of the user for display.

Figure 14:
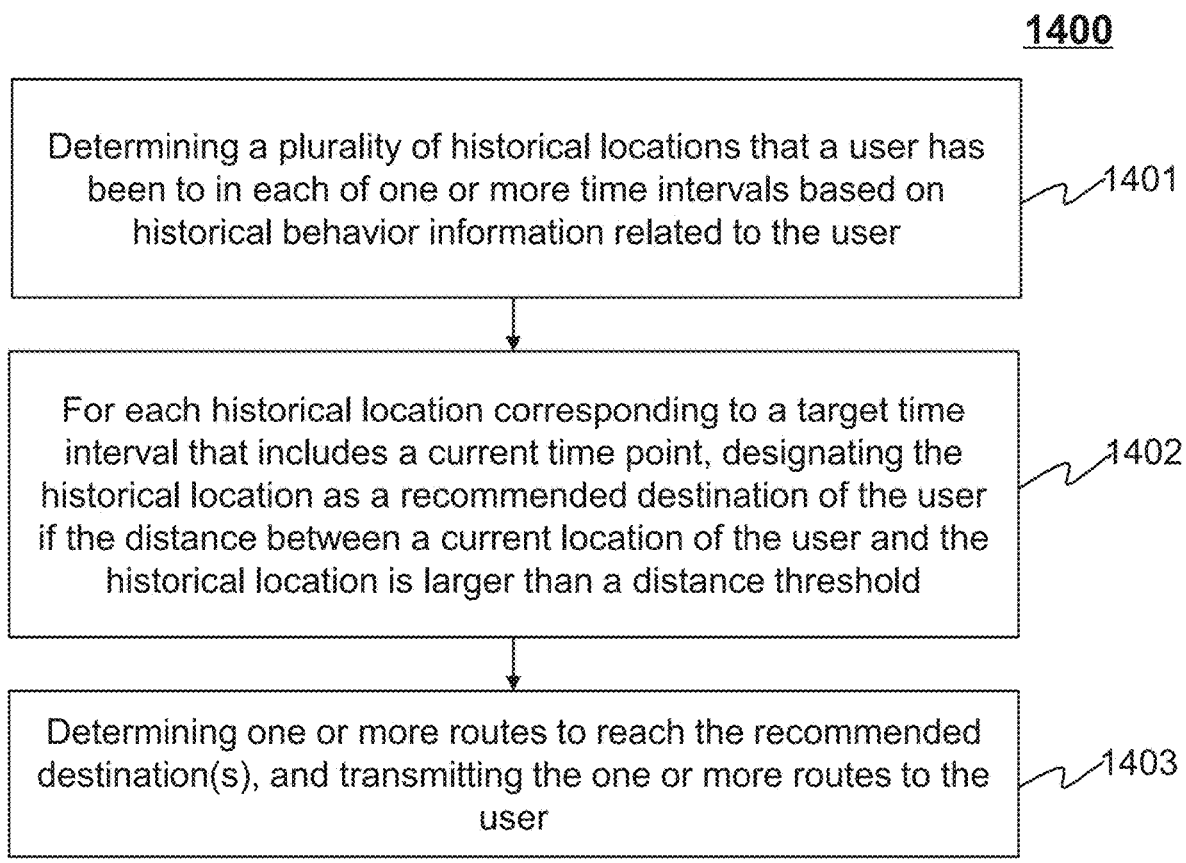
FIG. 14 is a flowchart illustrating an exemplary process for recommending one or more routes for a user according to some embodiments of the present disclosure.

FIG. 14 is a flowchart illustrating an exemplary process for recommending one or more routes for a user according to some embodiments of the present disclosure. Process 1400 may be an embodiment of the process 1200 in which the recommended destination(s) are determined based on historical location(s) that the user has been to. In some embodiments, the process 1400 may be performed by any device for recommending routes (e.g., any of the devices 1100A to 1100E). In some embodiments, the process 1400 may be implemented in the LBS system 100 illustrated in FIG. 1. For example, the process 1400 may be stored in a storage medium (e.g., the storage device 150, the ROM 230, the RAM 240, the storage 390) as a form of instructions, and invoked and/or executed by the server 110 (e.g., the processing engine 112 of the server 110, the processor 220 of the computing device 200), a terminal device (e.g., the requester terminal 130), a device for recommending routes (e.g., any of the devices 1100A to 1100E). For illustration purposes, the implementation of the process 1400 on the device 1100A is described as an example.

In 1401, the device 1100A may determine a plurality of historical locations that the user has been to in each of one or more time intervals based on historical behavior information related to the user.

In 1402, for a historical location corresponding to a target time interval that includes the current time point, the device 1100A may designate the historical location as a recommended destination of the user if a distance between the current location of the user and the historical location is larger than a distance threshold.

The historical behavior information may include one or more historical locations that the user has been to. The device 1100A may determine one or more historical locations that a user has been to in each of one or more time intervals based on the historical behavior information related to the user. The historical location(s) corresponding to a time interval may represent location(s) that the user has usually been to in the time interval, i.e., location(s) that the user is interested in or needs to go to in the time interval. Further, the device 1100A may filter out one or more historical locations corresponding to a target time interval that includes the current time point (also referred to as candidate POIs for brevity). For each candidate POI, the device 1100A may determine whether the current location of the user is near the candidate POI. For example, the device 1100A may determine whether the current location is located within a threshold distance to the candidate POI. If the current location of the user is not within the threshold distance to the candidate POI, the device 1100A may speculate that the user wants to go to the candidate POI, and designate the candidate POI as a recommended destination. Further, the device 1100A may determine one or more routes to the recommended destination, and transmit the route(s) to the mobile device (e.g., the requester terminal 130) of the user for display. If the current location of the user is located within the threshold distance to each candidate POI, the device 1100A may skip the candidate POI(s) and determine one or more recommended destinations by, for example, performing other processes described elsewhere in the present disclosure (e.g., process 1200, process 1300, process 1500).

For example, the device 1100A may determine locations that the user has been to in different time intervals, and find out that the user was usually at a workplace (e.g., Xizhimen) during the time interval from 10:00 a.m. to 11:00 a.m. Thus, if the current location of the user is not near Xizhimen at 11:20 a.m., the device 1100A may speculate that the user needs to go to Xizhimen at 11:20 a.m.

In the process 1400, the device 1100A may determine the recommended destination(s) that the user wants to go to based on the historical locations that the user has been to in one or more time intervals. The device 1100A may determine the one or more routes to reach each of the recommended destination(s), and transmit the route(s) to the mobile device (e.g., the requester terminal 130) of the user quickly and accurately.

FIG. 15 is a flowchart illustrating an exemplary process for recommending one or more routes for a user according to some embodiments of the present disclosure. Process 1500 may be an embodiment of the process 1200 in which the recommended destination(s) are determined based on historical transportation service orders initiated by the user. In some embodiments, the process 1500 may be performed by any device for recommending routes (e.g., any of the devices 1100A to 1100E). In some embodiments, the process 1500 may be implemented in the LBS system 100 illustrated in FIG. 1. For example, the process 1500 may be stored in a storage medium (e.g., the storage device 150, the ROM 230, the RAM 240, the storage 390) as a form of instructions, and invoked and/or executed by the server 110 (e.g., the processing engine 112 of the server 110, the processor 220 of the computing device 200), a terminal device (e.g., the requester terminal 130), a device for recommending routes (e.g., any of the devices 1100A to 1100E). For illustration purposes, the implementation of the process 1500 on the device 1100A is described as an example.

In 1501, the device 1100A may obtain one or more historical service orders initiated by the user in each of one or more time intervals based on historical behavior information related to the user.

In 1502, the device 1100A may designate one or more destinations of the historical service order(s) corresponding to a target time interval that includes a current time point as one or more recommended destinations.

The historical behavior information may include one or more historical service orders initiated by the user, e.g., historical express orders, historical vehicle-hailing orders, etc. The device 1100A may obtain the historical service orders initiated by the user based on data stored in a back-end server of a travel application or a back-end database. The device 1100A may determine historical service orders initiated by the user in one or more time intervals based on the historical behavior information related to the user. Further, the device 1100A may select one or more historical service orders corresponding to the target time interval that includes a current time point. The device 1100A may designate one or more historical destinations of the historical service order(s) corresponding to the target time interval as recommended destination(s) of the user. The device 1100A may determine one or more routes to reach each of the recommended destination(s) for the user, and transmit the route(s) to the mobile device (e.g., the requester terminal 130) of the user for display.

For example, the device 1100A may analyze historical service orders of a user, and find out that in a certain period, such as 6:00 p.m. to 7:00 p.m., the user usually sets his/her workplace as a start location and home (e.g., Xitucheng) as a destination of a transportation service order (e.g., an express service, a taxi service, a navigation service). If the current time is 6:00 p.m., the device 1100A may speculate that a destination that the user is currently interested in is Xitucheng.

In the process 1500, the device 1100A may analyze the historical transportation service orders of the user in one or more time intervals to recommended one or more destinations. The device 1100A may determine the one or more routes to reach each of the recommended destination(s), and transmit the route(s) to the mobile device (e.g., the requester terminal 130) of the user quickly and accurately.

It should be noted that processes 1300 to 1500 may be implemented separately or in combination to recommend one or more routes to reach one or more recommended destinations for a user. In some embodiments, the device 1100A may determine a priority of the processes 1300 to 1500 according to actual situations. For example, the device 1100A may determine the recommended destination(s) based on recent user behaviors according to any of processes 1300-1500. As another example, the device 1100A may designate a destination that is recommended by all of the processes 1300 to 1500 as a final recommended destination. As a further example, the device 1100A may further screen the recommended destination(s) generated by the processes 1300 to 1500 according to the distance between the current location of the user and each recommended destination. If the current location of the user is near the recommended destination (e.g., the distance between the current location and the recommended destination is smaller than a threshold distance), the user may not need to go the recommended destination, and the device 1100A may skip the recommended destination. The process for recommending route(s) may be not limiting in the present disclosure.

In some embodiments, the device 1100A may obtain the current location of the user based on a positioning technique (e.g., Global Positioning Systems, GPS). For example, the current location of the user may be determined by a terminal device of the user. The current time point may be determined by a back-end server (e.g., the server 110) or the terminal device of the user. In some embodiments, the terminal device of the user may transmit the current time point and the current location of the user to the device 1100A. Specifically, the device 1100A may analyze historical behavior information of the user in advance. The historical behavior information of the user may include historical location(s) corresponding to one or more time intervals. The historical location(s) may include a location searched by the user, a historical location that the user has been to, a historical destination of a historical service order of the user, or the like, or any combination thereof. The device 1100A may accurately determine a destination that the user wants to go at a current time based on the historical behavior information of the user.

In some embodiments, the device 1100A may determine the time interval(s) based on requirements on the analysis efficiency and analysis accuracy. For example, the device 1100A may divide one day into 24 time intervals each of which lasts for an hour. As another example, the daytime may be divided into shorter time intervals while night may be divided into longer time intervals, considering that the user is more likely to go to different locations in daytime.

In some embodiments, a plurality of POIs that the user is interested in the target time interval may be determined by analyzing historical behavior information related to the user. The device 1100A may filter out one or more of the POIs that are within a threshold distance to the current location of the user, considering that the user normally does not need to search a route to a nearby place. This may improve the efficiency and accuracy for recommending routes for the user.

In some embodiments, after the route(s) is determined, the device 1100A may rank the route(s) and transmit the ranked route(s) to the user. In some embodiments, the device 1100A may rank the route(s) based on a preset strategy, such as a default ranking rule. For example, the route(s) may be ranked according to the walking distance along the route, the route distance, the travelling time, or the like, or any combination thereof. As another example, the device 1100A may ranking the route(s) based on user preference, for example, a route frequently selected by the user and/or other users may have a high ranking. Specifically, after the recommended destination(s) and the route(s) to reach each of the recommended destination(s) are determined, the device 1100A may determine a portion of the route(s) based on a strategy. The strategy may reflect the actual demand of the user. For example, the device 1100A may determine a route that may be selected or needed by the user. In some embodiments, the device 1100A may determine the user demand by analyzing historical behaviors of the user. For example, a route that was selected or browsed by the user may be a route that the user needs at the current time point, which may be recommended to the user.

FIG. 16 is a flowchart illustrating an exemplary process for recommending one or more routes for a user according some embodiments of the present disclosure. Process 1600 may be an embodiment of any of the processes 1200 to process 1500. In some embodiments, the process 1600 may be performed by any device for recommending routes (e.g., any of the devices 1100A to 1100E). In some embodiments, the process 1600 may be implemented in the LBS system 100 illustrated in FIG. 1. For example, the process 1600 may be stored in a storage medium (e.g., the storage device 150, the ROM 230, the RAM 240, the storage 390) as a form of instructions, and invoked and/or executed by the server 110 (e.g., the processing engine 112 of the server 110, the processor 220 of the computing device 200), a terminal device (e.g., the requester terminal 130), a device for recommending routes (e.g., any of the devices 1100A to 1100E). For illustration purposes, the implementation of the process 1600 on the device 1100A is described as an example.

In 1601, the device 1100A may recommend one or more bus routes passing through one or more bus stations near a user if historical behavior information related to the user does not include historical behavior information corresponding to a current time point. For example, if the historical behavior information does not include a historical location searched, browsed, or visited by the user in the target time interval that includes the current time point, the device 1100A may recommend the bus route(s). In some embodiments, a bus station may be regarded as near the user if the distance (e.g., the linear distance, the route distance) between the bus station and the user is equal to or smaller than a threshold (e.g., 200 meters, 500 meters, 1000 meters).

In some embodiments, the device 1100A may recommend one or more public transportation routes passing through another type of public transportation station near the user. The public transportation station may include a subway station, a train station, a rent station of sharing vehicles (e.g., bicycles, motorcycles), or the like, or any combination thereof. For brevity, a public route passing through a public transportation station near the user may be referred to as a public transportation routes near the user (or a terminal device of the user). For illustration purposes, the present disclosure takes the bus station as an example.

In 1602, in response to a user selection of one of the bus routes, the device 1100A may generate a relationship between a target time interval including the current time point, the current location of the user, and the bus route selected by the user. The device 1100A may store the relationship into a set of candidate public routes of the user.

In some embodiments, referring back to the process 1200 and assuming that the process 1200 is performed for a user at the current time point A when he/she is at the current location A, the device 1100A may determine whether the set of candidate public routes includes a candidate public route corresponding to a target time interval including the current time point A and the current location A of the user before operation 1201. If so, the device 1100A may recommend the candidate public route corresponding to the target time interval and the current location A to the user. If all of set of the candidate public routes do not correspond to the target time interval and the current location A of the user, the device 1100A may determine the one or more recommended destinations based on historical behavior information related to the user and the current time point. As described above, a candidate public route B may correspond to a target time interval B including the time point when it was selected by the user and a location B at which the user selected the candidate public route B. As used herein, the candidate public route B may be regarded as being corresponding to the current time point A and the current location A if the target time interval B includes the current time point A and the location B is near the current location A of the user (e.g., the distance between the location B and the current location A is shorter than a threshold distance).

In some embodiments, the device 1100A may obtain one or more candidate POIs of a user corresponding to a target time interval that includes a current time point based on historical behavior information related to the user. However, there may be an occasional transportation need of the user. Accordingly, if the historical behavior information related to the user does not include information corresponding to the target time interval, the device 1100A may not determine a recommended destination corresponding to the current time point according to any of processes 1200 to 1500 described above. In this case, the device 1100A may recommend one or more public routes (e.g., bus routes) passing through a transportation station (e.g., bus station) near the user based on the current location of the user. The device 1100A may generate a relationship between the target time interval, the current location of the user, and the public route (e.g., a bus route) selected by the user. The device 1100A may further store the relationship into a set of candidate public routes of the user. When recommending route(s) for the user again, the device 1100A may obtain and recommend a candidate public route in the set of candidate public routes to the user. If there is no candidate public route corresponding to the current location of the user and the current time point, the device 1100A may then recommend a destination corresponding to the current time based on the historical behavior information related to the user. The device 1100A may further determine one or more routes to reach each of the one or more recommended destinations for the user, and transmit the route(s) to the mobile device (e.g., the requester terminal 130) of the user for display.

For example, since the user usually selects a nearby public station to take a public transportation, the device 1100A may recommend one or more public routes passing through one or more transportation stations based on the current location of the user when a recommended destination can not be determined based on the historical behavior information of the user. If the user selects one of the recommended public routes, the device 1100A may display the selected public route, and store the relationship between the selected public route, the current location of the user, and the current time point. If the device 1100A determines that the user is at the current location at the current time point or a time point close to the current time point in another day, the device 1100A may recommend the selected public route to the user.

In the process 1600, the device 1100A may assign a higher priority to a public route that was selected by the user for recommendation, and a lower priority to other routes selected by other users. The device 1100A may determine one or more candidate public routes, which may satisfy an occasional transportation need of the user and improve the reliability of route recommendation.

The present disclosure provides processes for determining one or more routes. Based on historical behavior information of a user, the device 1100A may obtain one or more candidate POIs of the user corresponding to a target time interval that includes the current time point. The device 1100A may further designate the candidate POI(s) as one or more recommended destinations of the user. Further, the device 1100A may determine one or more routes to reach each of the recommended destination(s) for the user, and transmit the route(s) to the mobile device (e.g., the requester terminal 130) of the user for display. The device 1100A may determine the destination(s) of the user accurately without a manual input of the user, and recommend the route(s) for the user based on the current location of the user, which may improve a convenience of recommending routes and travelling.

What is claimed is:

1. A system for remotely operating an interface of a mobile device, comprising:

an information exchange port in communication with a mobile device to remotely control an interface of the mobile device;

at least one storage medium including a set of instructions for displaying a recommended destination of a location-based service (LBS) on the interface;

at least one processor in communication with the at least one storage medium, wherein when executing the set of instructions, the at least one processor is configured to direct the system to:

receive a request for an LBS sent from the mobile device through the information exchange port;

obtain a current time point in response to the request for the LBS;

obtain historical behavior information related to a user of the mobile device, wherein the historical behavior information includes a plurality of historical destinations;

obtain first geographic information of a first historical destination and second geographic information of a second historical destination, wherein the first and second historical destinations are different historical destinations among the plurality of historical destinations;

merge, based on a first distance between the first and second geographic information, the first and second historical destinations to generate a merged historical destination;

for each of the plurality of historical destinations and the merged historical destination, determine a probability that the user goes to the historical destination at the current time point based on the historical behavior information;

determine, based on the historical behavior information and the current time point, one or more recommended destinations for the user; and remotely control the interface of the mobile device, through the information exchange port, to display the one or more recommended destinations.

2. The system of claim 1, wherein the historical behavior information further includes one or more historical departure times corresponding to each of the plurality of historical destinations, and to determine the one or more recommended destinations for the user, the at least one processor is further configured to direct the system to:

determine the probability that the user goes to the historical destination at the current time point based on the historical behavior information; and determine, among the plurality of historical destinations, the one or more recommended destinations based on the probabilities corresponding to the plurality of historical destinations.

3. The system of claim 1, wherein to merge the first and second historical destinations, the at least one processor is further configured to direct the system to:

determine whether the first distance is less than a first threshold distance; and in response to a determination that the first distance is less than the first threshold distance, merge the first and second historical destinations into the merged historical destination.

4. The system of claim 2, wherein to determine the probability that the user goes to the historical destination at the current time point, the at least one processor is further configured to direct the system to:

determine an average departure time that the user went to the historical destination based on the one or more corresponding historical departure times; and determine the probability that the user goes to the historical destination at the current time point based on the corresponding average historical departure time.

5. The system of claim 4, wherein to determine the probability that the user goes to the historical destination at the current time point based on the corresponding average historical departure time, the at least one processor is further configured to direct the system to:

determine a standard deviation of the corresponding one or more historical departure times;

determine, based on the standard deviation and the corresponding average historical departure time, a distribution function of the corresponding one or more historical departure times; and determine, based on the distribution function, the probability that the user goes to the historical destination at the current time point.

6. The system of claim 4, wherein to determine the average historical departure time that the user went to the historical destination, the at least one processor is further configured to direct the system to:

form a time vector for each of the corresponding one or more historical departure times; and determine the average historical departure time based on a sum of the one or more time vectors corresponding to the one or more historical departure times.

7. The system of claim 1, wherein the historical behavior information related to the user further includes a plurality of point of interests (POIs) and one or more historical time points corresponding to each of the plurality of POIs, and to determine the one or more recommended destinations for the user, the at least one processor is further configured to direct the system to:

determine a target time interval corresponding to the current time point;

determine, among the plurality of POIs, one or more candidate POIs corresponding to the target time interval based on the one or more time points corresponding to each of the plurality of POIs; and determine, among the one or more candidate POIs, the one or more recommended destinations for the user.

8. The system of claim 7, wherein the plurality of POIs includes a plurality of locations searched by the user, and to determine the one or more recommended destinations among the one or more candidate POIs, the at least one processor is further configured to direct the system to:

rank the one or more candidate POIs based on a number of times that each candidate POI is searched by the user; and determine, based on the ranking result of the one or more candidate POIs, the one or more recommended destinations.

9. The system of claim 7, wherein the plurality of POIs includes a plurality of historical locations the user has been to, and to determine the one or more recommended destinations among the one or more candidate POIs, the at least one processor is further configured to direct the system to:

for each of the one or more candidate POIs, determine a second distance between the candidate POI and a current location of the user;

determine whether the second distance is greater than a second threshold distance; and in response to a determination that the second distance is larger than the second threshold distance, designate the candidate POI as one of the one or more recommended destinations.

10. The system of claim 7, the at least one processor is further configured to direct the system to:

obtain one or more public transportation routes near the mobile device;

remotely control the interface of mobile device, through the information exchange port, to display the one or more public transportation routes on the interface of the mobile device;

receive a user selection on the interface regarding the one or more public transportation routes; and store the user selection, the current location, and the target time interval into the at least one storage medium.

11. A method for remotely operating an interface of a mobile device, comprising:

receiving a request for a Location-based service (LBS) sent from the mobile device through an information exchange port;

obtaining a current time point in response to the request for the LBS;

obtaining historical behavior information related to a user of the mobile device, wherein the historical behavior information includes a plurality of historical destinations;

obtaining first geographic information of a first historical destination and second geographic information of a second historical destination, wherein the first and second historical destinations are different historical destinations among the plurality of historical destinations;

merging, based on a first distance between the first and second geographic information, the first and second historical destinations to generate a merged historical destination;

for each of the plurality of historical destinations and the merged historical destination, determining a probability that the user goes to the historical destination at the current time point based on the historical behavior information;

determining, based on the historical behavior information and the current time point, one or more recommended destinations for the user; and remotely controlling the interface of the mobile device, through the information exchange port, to display the one or more recommended destinations.

12. The method of claim 11, wherein the historical behavior information further includes one or more historical departure times corresponding to each of the plurality of historical destinations, and determining the one or more recommended destinations for the user includes:

determining the probability that the user goes to the historical destination at the current time point based on the historical behavior information; and determining, among the plurality of historical destinations, the one or more recommended destinations based on the probabilities corresponding to the plurality of historical destinations.

13. The method of claim 12, wherein determining the probability that the user goes to the historical destination at the current time point includes:

determining an average departure time that the user went to the historical destination based on the one or more corresponding historical departure times; and determining the probability that the user goes to the historical destination at the current time point based on the corresponding average historical departure time.

14. The method of claim 13, wherein determining the probability that the user goes to the historical destination at the current time point based on the corresponding average historical departure time includes:
   determining a standard deviation of the corresponding one or more historical departure times;
   determining, based on the standard deviation and the corresponding average historical departure time, a distribution function of the corresponding one or more historical departure times; and
   determining, based on the distribution function, the probability that the user goes to the historical destination at the current time point.

15. The method of claim 11, wherein the historical behavior information related to the user further includes a plurality of point of interests (POIs) and one or more historical time points corresponding to each of the plurality of POIs, and determining the one or more recommended destinations for the user includes:
   determining a target time interval corresponding to the current time point;
   determining, among the plurality of POIs, one or more candidate POIs corresponding to the target time interval based on the one or more time points corresponding to each of the plurality of POIs; and
   determining, among the one or more candidate POIs, the one or more recommended destinations for the user.

16. The method of claim 15, wherein the plurality of POIs includes a plurality of locations searched by the user, and
   determining the one or more recommended destinations among the one or more candidate POIs includes:
      ranking the one or more candidate POIs based on a number of times that each candidate POI is searched by the user; and
      determining, based on the ranking result of the one or more candidate POIs, the one or more recommended destinations.

17. The method of claim 15, wherein the plurality of POIs includes a plurality of historical locations the user has been to, and
   determining the one or more recommended destinations among the one or more candidate POIs includes:
   for each of the one or more candidate POIs,
      determining a second distance between the candidate POI and a current location of the user;
      determining whether the second distance is greater than a second threshold distance; and
      in response to a determination that the second distance is larger than the second threshold distance, designating the candidate POI as one of the one or more recommended destinations.

18. A non-transitory computer readable medium, comprising executable instructions that, when executed by at least one processor, directs the at least one processor to perform a method, the method comprising:
   receiving a request for a location-based service (LBS) sent from a mobile device through an information exchange port;
   obtaining a current time point in response to the request for the LBS;
   obtaining historical behavior information related to a user of the mobile device, wherein the historical behavior information includes a plurality of historical destinations;
   obtaining first geographic information of a first historical destination and second geographic information of a second historical destination, wherein the first and second historical destinations are different historical destinations among the plurality of historical destinations;
   merging, based on a first distance between the first and second geographic information, the first and second historical destinations to generate a merged historical destination;
   for each of the plurality of historical destinations and the merged historical destination, determining a probability that the user goes to the historical destination at the current time point based on the historical behavior information;
   determining, based on the historical behavior information and the current time point, one or more recommended destinations for the user; and
   remotely controlling an interface of the mobile device, through the information exchange port, to display the one or more recommended destinations.

19. The system of claim 1, wherein to determine the one or more recommended destinations based on the probabilities corresponding to the plurality of historical destinations, the at least one processor is further configured to direct the system to:
   designate, among the plurality of historical destinations, one or more historical destinations with the highest probability as the recommended destination; or
   designate, among the plurality of historical destinations, one or more historical destinations with the corresponding probability greater than a preset threshold as the recommended destination.

20. The method of claim 12, wherein determining the one or more recommended destinations based on the probabilities corresponding to the plurality of historical destinations further includes:
   designating, among the plurality of historical destinations, one or more historical destinations with the highest probability as the recommended destination; or
   designating, among the plurality of historical destinations, one or more historical destinations with the corresponding probability greater than a preset threshold as the recommended destination.

* * * * *